United States Patent [19]

Kawamura et al.

[11] Patent Number: 5,222,159
[45] Date of Patent: Jun. 22, 1993

[54] IMAGE PROCESSING METHOD AND APPARATUS FOR EXTRACTING A PORTION OF IMAGE DATA

[75] Inventors: Naoto Kawamura, Yokohama; Mamoru Sato, Tokyo, all of Japan

[73] Assignee: Canon Kabushiki Kaisha, Tokyo, Japan

[21] Appl. No.: 715,897

[22] Filed: Jun. 19, 1991

Related U.S. Application Data

[63] Continuation of Ser. No. 408,954, Sep. 18, 1989, abandoned, which is a continuation of Ser. No. 268,689, Nov. 7, 1988, abandoned, which is a continuation of Ser. No. 886,222, Jul. 16, 1986, abandoned.

[30] Foreign Application Priority Data

Jul. 19, 1985 [JP] Japan .................................. 60-158434
Jul. 24, 1985 [JP] Japan .................................. 60-161747
Jul. 26, 1985 [JP] Japan .................................. 60-163853
Jul. 30, 1985 [JP] Japan .................................. 60-166720

[51] Int. Cl.$^5$ .................................. G06K 9/20
[52] U.S. Cl. .................................. 382/48; 382/54
[58] Field of Search .................... 382/16, 17, 22, 25, 382/27, 28, 30, 32-34, 41, 47-49, 54; 358/30, 282-284, 300; 355/202

[56] References Cited

U.S. PATENT DOCUMENTS

| | | | |
|---|---|---|---|
| 3,905,018 | 9/1975 | Gray | 382/34 |
| 4,292,622 | 9/1981 | Henrichon, Jr. | 382/54 |
| 4,538,182 | 8/1985 | Saito et al. | 382/17 |
| 4,556,915 | 12/1985 | Shibata et al. | 358/280 |
| 4,589,140 | 5/1986 | Bishop et al. | 382/14 |
| 4,646,355 | 2/1987 | Petrick et al. | 382/49 |
| 4,737,804 | 4/1988 | Ayata et al. | 358/300 |
| 4,739,350 | 4/1988 | Arao | 358/300 |
| 4,745,491 | 5/1988 | Kishi et al. | 358/300 |
| 4,920,502 | 4/1990 | Yamada | 382/16 |

Primary Examiner—Jose L. Couso
Attorney, Agent, or Firm—Fitzpatrick, Cella, Harper & Scinto

[57] ABSTRACT

An image processing method and apparatus for extracting a part of original image data. The mask data to extract a part of original image data is provided as a unit larger than the pixel unit of the original image data. The mask data at the objective position is corrected by use of the mask data at a plurality of positions. A part of the original image data is extracted on the basis of the corrected mask data. The mask data is stored in a memory and corrected on a pixel unit basis of the original image data. Since the mask boundary data is stored into the mask memory, the image converting processes such as enlargement, reduction, rotation, etc. can be performed by use of the mask memory of a small capacity without limiting the mask shape. With this apparatus, the mask image data having the smooth edge portion can be obtained.

30 Claims, 30 Drawing Sheets

FIG. 14
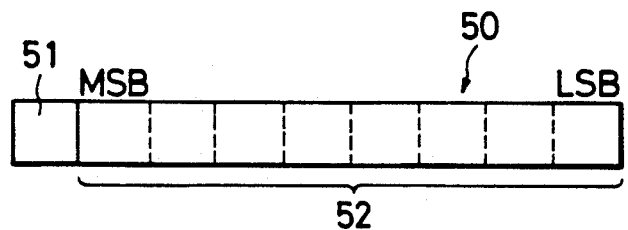
FIG. 16A
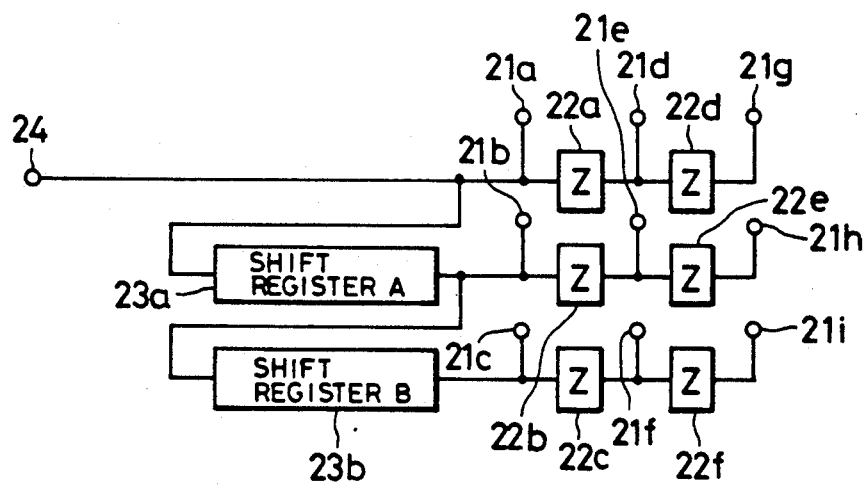
FIG. 16B

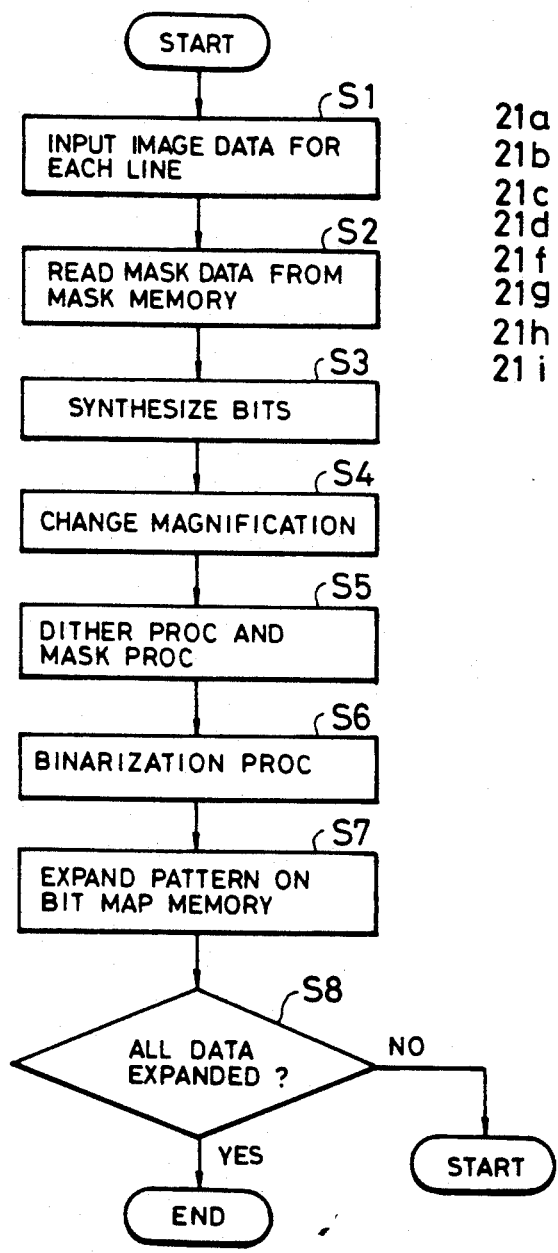
FIG. 15
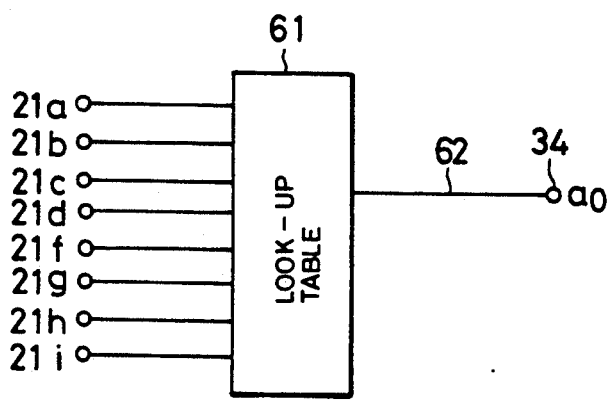
FIG. 17
FIG. 18

| 0 | 0 | 0 |
|---|---|---|
| 0 | $a_0$ | 1 |
| 0 | 1 | 1 |

$\longrightarrow a_0 = 0$

| 0 | 0 | 0 |
|---|---|---|
| 0 | $a_0$ | 0 |
| 1 | 1 | 1 |

$\longrightarrow a_0 = 0$

| 0 | 0 | 1 |
|---|---|---|
| 0 | $a_0$ | 1 |
| 1 | 1 | 1 |

$\longrightarrow a_0 = 1$

| 0 | 1 | 1 |
|---|---|---|
| 0 | $a_0$ | 1 |
| 0 | 1 | 1 |

$\longrightarrow a_0 = 1$

FIG. 26A
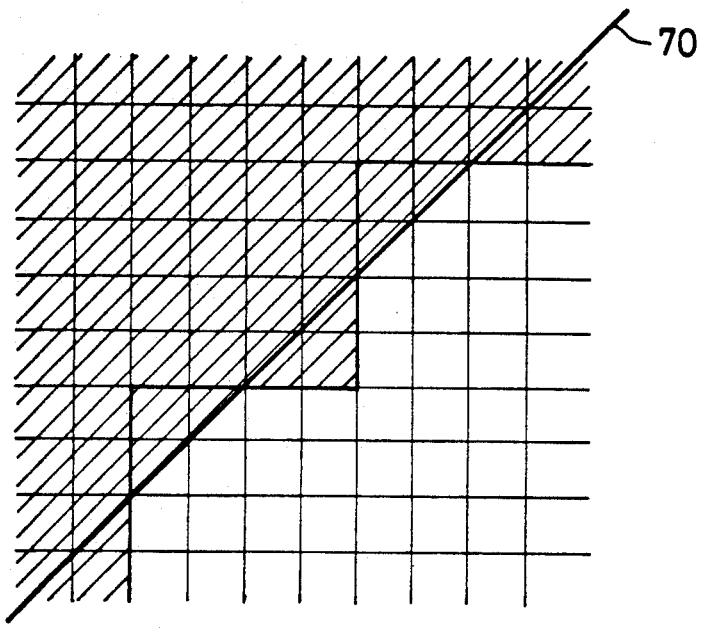
FIG. 27A
| 1 | 1 | 1 | 1 | 1 |
| 1 | 1 | 1 | 1 | 1 |
| 1 | 1 | 1 | 1 | 1 |
| 1 | 1 | 1 | 1 | 1 |
| 1 | 1 | 1 | 1 | 1 |
FIG. 27B
| 1 | 1 | 1 |
| 1 | 2 | 1 |
| 1 | 1 | 1 |
FIG. 26B
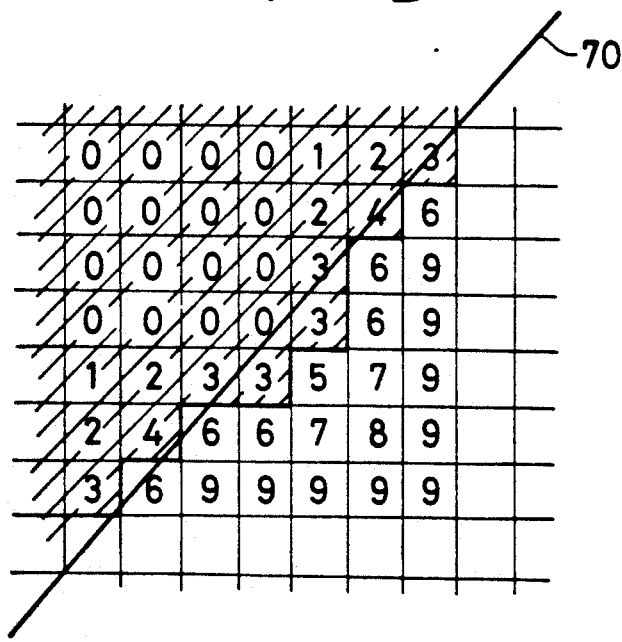
FIG. 27C
| 1 | 1 | 1 | 1 | 1 |
| 1 | 1 | 1 | 1 | 1 |
| 1 | 1 | 1 | 1 | 1 |

IMAGE PROCESSING METHOD AND APPARATUS FOR EXTRACTING A PORTION OF IMAGE DATA

This application is a continuation of application Ser. No. 07/408,954, filed Sep. 18, 1989, now abandoned which is a continuation of application Ser. No. 07/268,689, filed Nov. 7, 1988, now abandoned, which is a continuation of application Ser. No. 06/886,222, filed Jul. 16, 1986, now abandoned.

BACKGROUND OF THE INVENTION

1. Field of the Invention

The present invention relates to an image processing method and apparatus for edition processing of image data and, more particularly, to an image processing method and apparatus for extracting a part of image data.

2. Related Background Art

Editing an image is generally performed by masking a part of image data and extracting only the remaining part of the image. Such a process is hereinafter referred to as a mask process. In many cases, it is required to extract a complicated shape other than rectangle and regular polygon.

However, in such a case, as in the first conventional example, a bit map memory to store the mask data for extraction) which corresponds to the image data in a one-to-one corresponding manner is provided, and an extracting operation is performed for discriminating whether image data is the data to be extracted or the data to be abandoned (i.e. the masked data) in accordance with the mask data stored in the bit map memory and for extracting only desired image data.

However, this method has the drawbacks such that when an image of high resolution is handled, the capacity of the bit map memory for masking increases and the cost rises.

Further, in the case of enlarging the image or the like after extraction due to the mask process, the oblique edge of the mask is notched due to the enlargement of the pixels, so that the boundary portion of the extracted image data is hard to see.

According to the method of the first example mentioned above, in many cases, only the data in a desired region is extracted from one image and the result is written into the designated image memory. Further, in many cases, this image memory is the bit map memory for storing the image data which was generally binarized due to a dither method, a density pattern method, or the like. In this memory, one bit corresponds to one pixel. This is because when an image of high resolution is handled, the cost of the memory for storing the image data is remarkably reduced.

In such a method, in the case of synthesizing a plurality of masked images into the designated image memory, each image is overlappingly written into the memory in accordance with an order and a priority given to the image data which will be written later used. FIGS. 1A and 1B are diagrams for explaining such a method and show the case of synthesizing an image A masked like a circle for simplicity and an image B masked like a heart. The image A is first formed in the memory and the image B is then synthesized, and the overlapped portion of both images shown in FIG. 1A is added to the image B formed later, so that the image B is preferentially processed. This is because the image data in the memory has already been binarized due to a dither method or the like and the source data in the image portion where the image A overlaps has been lost, so that it is impossible to perform the process to give a priority to the image A.

On the other hand, there is a demand for forming portion C where both images overlap such that both images overlap (namely, like transparent images) as shown in FIG. 1B. However, such a need cannot be realized by the conventional method discussed above.

A second conventional mask process, for use in a graphic display controller or the like approximates the extracted mask pattern by a set of several rectangles and the input image (memory) address is produced from the output image address.

An explanation will now be provided as an example of the case where a part of original image data shown in FIG. 2A is extracted to thereby obtain a desired image, e.g., an image shown in FIG. 2B or the case where a part of the original image data is deleted to thereby derive a desired image, e.g., an image shown in FIG. 2C.

In this case, a mask pattern for extraction or deletion becomes a hatched portion 4 shown in FIG. 3.

In the case of the foregoing first example, the mask pattern portion 4 in an original image region 5 shown in FIG. 3 is held in a bit map mask memory in a one-to-one corresponding manner. For example, "1" is stored into the memory corresponding to the hatched portion 4 and "0" is stored into the memory corresponding to the white (i.e., blank) portion 5. The content of this bit map memory is read out synchronously with the original image shown in FIG. 2A. In this case, if "1" is effective, the image shown in FIG. 2B will be obtained. If "0" is effective, the image shown in FIG. 2C will be derived.

FIG. 4 shows a block diagram of a conventional mask data producing section to implement the first example.

In FIG. 4, reference numeral 8 denotes a bit map memory; 10 is a sub scan counter; 11 is a main scan counter; 15 is a latch; 16 denotes an image start signal; 17 denote a main scan start signal; and 18 denotes a pixel clock signal.

The counters 10 and 11 are reset by the image start signal 16 and main scan start signal 17, respectively. The main scan counter 11 is sequentially counted up in response to the given pixel clock signal 18. The content (mask bits) in the bit map memory 8 which was addressed by the main scan address value indicated by the main scan counter 11 and the sub scan address value indicated by the sub scan counter 10 is read out and latched into the latch 15 and then output. On the other hand, the counter 10 is counted up by the main scan start signal 17.

FIG. 5 shows an example of storage of the mask pattern shown in FIG. 3 in the conventional bit map memory 8.

In the bit map memory 8, the memory cell selected by a sub scan address 10 and a main scan address 11 is read out. For example, when the content is "0", the image is not copied. When it is "1", the copying process of the image is executed.

The case of obtaining the images shown in FIGS. 2B and 2C in to the second example will now be described.

In this case, the one-to-one corresponding mask bit pattern is not held and, for example, the region 4 shown in FIG. 3 has such a shape that triangles are combined and this region is approximated by a set of rectangles, thereby executing the extracting process.

FIG. 6 shows an example of a set of the approximated rectangular extraction patterns.

In this example, the rectangular patterns are extracted by parameters $(X_1, Y_1)$, $(X_2, Y_2)$, $(X_3, Y_3)$, ..., $(X_8, Y_8)$ indicative of a set of rectangles.

Namely, when the addresses (X, Y) for the output pixel satisfy the following relations:

$(X_1 \leq X < X_2)$ and $(Y_1 \leq Y < Y_2)$; or
$(X_3 \leq X < X_4)$ and $(Y_3 \leq Y < Y_4)$; or
.
.
.
$(X_7 \leq X < X_8)$ and $(Y_7 \leq Y < Y_8)$.

the pixel at the relevant address position is extracted (or deleted), or the like. The image patterns processed by the above method are shown in FIGS. 7A and 7B. FIG. 7A corresponds to FIG. 2B. FIG. 7B corresponds to FIG. 2C.

In the foregoing first example, the mask memory of the bit map must have the same capacity as the image data. In such a constitution as shown in FIG. 5, in the case of the pixels of 1024 dots × 1024 dots, it is necessary to use a mask memory of a large capacity as much as 1 Mbits.

On the other hand, the actual mask pattern to be stored to the mask memory is not a perfect curve. For example, as a mask pattern for the image data of the hatched portion shown in FIG. 8, a pattern as shown in FIG. 9 is stored to the bit map mask memory. Thus, the pattern to be stored inevitably becomes stairway shaped on a pixel unit basis.

Therefore, in the case where after this image data was extracted and enlarged, it is multiplexed with another image, or the like, the extracted portion is enlarged due to the bit map of the rectangular pixels and the stairway shape in the boundary portion is also simultaneously enlarged, so that the reproduced image will become hard to see.

Further, in the case of the second example, since an image is subjected to the mask process as a rectangular figure, the extraction shape is limited and it is difficult to perform image converting processes such as enlargement, rotation, and the like, simultaneously with the extracting process and the like. In addition, in the enlarging process, the extracted shape inevitably becomes the fairly emphasized stairway shape, so that the reproduced image will become even more difficult to see.

SUMMARY OF THE INVENTION

It is an object of the present invention to provide an image processing method and apparatus which can solve the drawbacks of the conventional technology mentioned above.

Another object of the invention is to provide an image processing method and apparatus for designating a region by use of a memory of a small capacity.

Still another object of the invention is to provide an image processing method and apparatus which allows the edge portion of the extracted image data to smoothly change.

Still another object of the invention is to provide an image processing method and apparatus which can perform the mask process of a high picture quality by use of a mask memory of a small capacity.

In more detail, it is still another object of the invention to provide an image processing method and apparatus in which the mask data for extracting a part of original image data is subjected to the converting process similar to the converting process for the image and thereafter the converted mask data is corrected to thereby to extract the image.

Still another object of the invention is to provide an image processing method and apparatus in which a plurality of image data are subjected arbitrary mask processes and the image data can be arbitrarily overlapped.

Still another object of the invention is to provide an image processing method and apparatus in which by storing the boundary data of the mask in a mask memory, the capacity of the memory to store the mask data can be reduced and at the same time, the image conversion such as enlargement, reduction, rotation, and the like can be performed without limiting the extraction shape.

The above and other objects and features of the present invention will become apparent from the following detailed description and the appended claims with reference to the accompanying drawings.

BRIEF DESCRIPTION OF THE DRAWINGS

FIG. 14 is a diagram showing an example of an arrangement of the synthesized data of image data and masking data according to the first embodiment;

FIG. 15 is a flowchart for the image data processes of the first embodiment;

FIGS. 16A, 16B and 17 are detailed diagrams of a mask processing circuit of the first embodiment;

FIG. 18 is a diagram showing masking data of a matrix of 3×3 of the first embodiment;

FIGS. 26A and 26B are diagrams for explaining the smoothing process;

FIGS. 27A to 27C are diagrams showing examples of matrices;

DESCRIPTION OF THE PREFERRED EMBODIMENTS

First Embodiment

Figure 10:
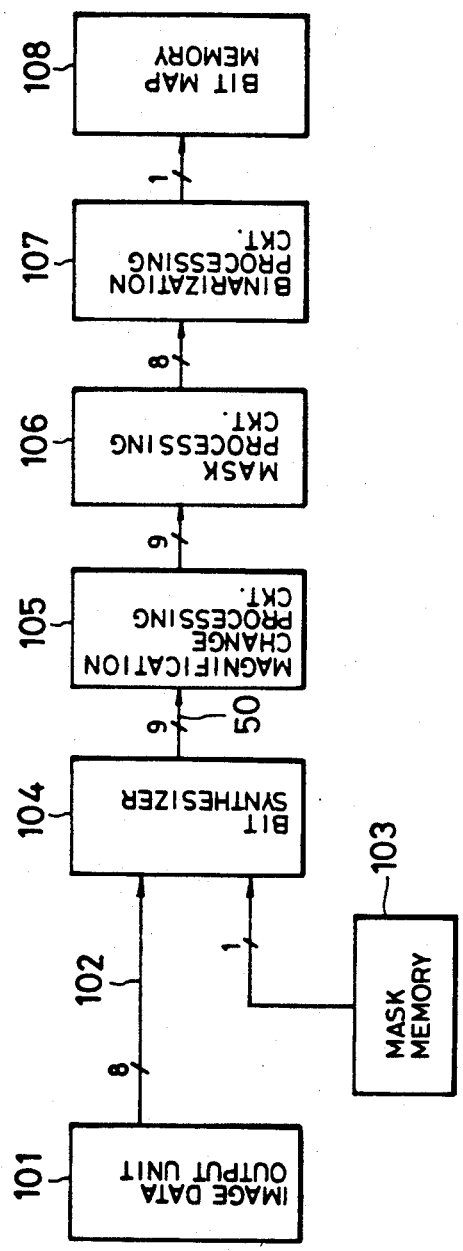
FIG. 10 is a block diagram of the first embodiment according to the present invention.

FIG. 10 is a block diagram of the first embodiment of the present invention. In the diagram, reference numeral 101 denotes an image data output unit to output time-sequential image data. The image data output unit 101 is constituted by, for example, a TV camera, CCD sensor, and the like. The image data is time sequentially sent as image data. In this embodiment, the image data is sequentially transmitted as raster image data of eight bits which was A/D converted.

Numeral 103 denotes a mask memory having a capacity smaller than that of a bit map memory 108; 104 is a bit synthesizer to synthesize mask data from the mask memory 103 and image data 102 from the output unit 101 to thereby produce synthesized data 50 of nine bits; 105 is a magnification change processing circuit to magnify the synthesized data 50 as necessary; 106 a mask processing circuit to separate the mask data from the magnified synthesized data and smooth the mask data and also perform the mask process in accordance with this mask data; 107 denotes a binarization processing circuit to binarize the mask processed image data which is transmitted from the mask processing circuit 106 by a well-known method, thereby performing the dither process; and 108 denotes the bit map memory to store the binarized image data from the binarization processing circuit 107. The image data stored in the bit map memory 108 is sequentially read out and processed as necessary.

As an example, the extracting process (mask process) of the image data in the case where original image data 110 indicated in FIG. 11 was sent from the image data output unit 101 will now be described hereinbelow with reference to a flowchart of FIG. 15 as well.

First, in step S1, the image data 102 is transmitted for each line from the output unit 101. For example, this image data shows three children indicated at (110) in FIG. 11. On the other hand, the heart-shaped portion shown at (111) in FIG. 11 is extracted and the mask bits to expand only the image data shown in FIG. 12 in the bit map memory 108 are stored in the mask memory 103.

Figure 11:
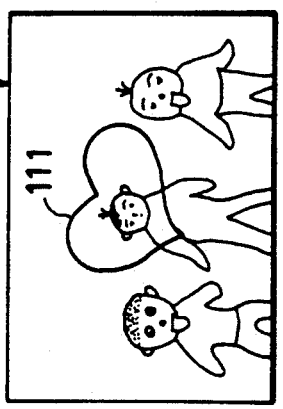
FIG. 11 is a diagram showing an original image.
Figure 13A:
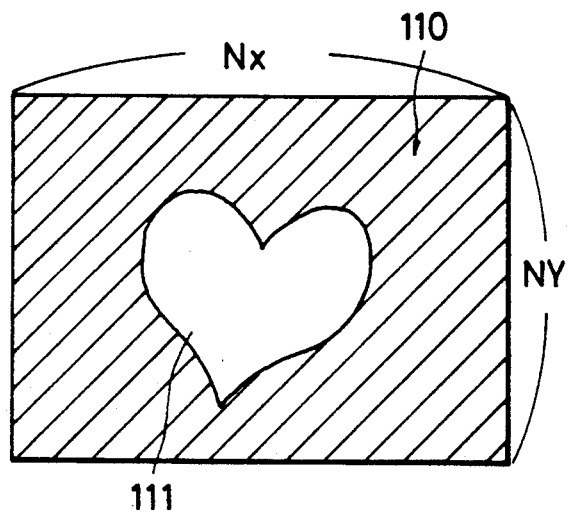
FIGS. 13A and 13B are diagrams showing expanded examples of masking data from the mask memory.

For instance, it is assumed that the image data shown in FIG. 11 is composed of pixels of $N_x \times N_y$ as shown in FIG. 13A. In this case, if the capacity of the mask memory 103 is above $N_x \times N_y$, the mask portion (hatched portion) excluding the portion corresponding to the extracted portion 111 is set to "0" and the extracted portion 111 is set to "1", thereby enabling these portions to correspond to the pixels in a one-to-one corresponding manner. The mask data is read out of the mask memory for each pixel of the image data in step S2 and synthesized by the bit synthesizer 104 in the next step S3.

Figure 13B:
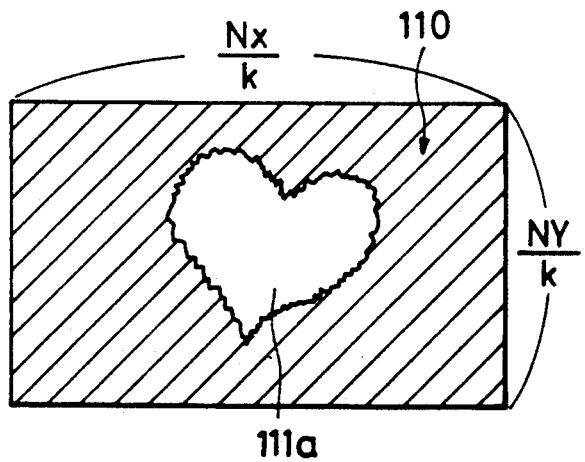

However, in the case where the capacity of the mask memory 103 is so small to be only 1/k of the image data, the boundary portion of an extracted portion (portion of "0" in the mask memory) 111a is notched as shown in FIG. 13B. In the case of performing the mask process by use of the mask memory 103 of such a small capacity (when the capacity in each of the X and Y directions is 1/k of the number of pixels, the capacity decreases to $1/k^2$), the extracting timing of the data from the mask memory is thinned out to 1/k. Therefore, the mask process is executed on a (k x k)-pixel unit basis of the image data, and the same mask data is continuously output. In this case as well, the bits are synthesized on a pixel unit basis by the bit synthesizer 104. The synthesized bits are output as the synthesized data 50 of total nine bits of which the mask data was written into the most significant bit for the image data 102 which is transmitted as weight-bit data. In this case, if the capacity of the mask memory 103 is small, one mask data is repeatedly used for the image data of k×k pixels.

FIG. 14 shows an arrangement of the synthesized data 50 which is output from the bit synthesizer 104. In the diagram, numeral 51 denotes mask data and 52 is image data.

In step S4, the bit synthesized image data 50 is subjected to the image magnifying conversion, i.e., enalrgement, reduction, and the like as necessary by the magnification change processing circuit 105 at the post stage by a well-known method. The enlarging process of the image will now be described as an example of the conversion hereinbelow. For example, in the case of tripling the image, the same three pixels of the raster output image data are successively output in the main scanning direction. Similarly, the same data of three lines is also output in the sub scanning direction. Therefore, the output of the image data 102 needs to be held in the magnification change processing circuit 105 for every line (corresponding to one line in the main scanning direction). The synthesized data 50 of nine bits which was tripled in each of the main and sub scanning directions is transmitted to the mask processing circuit 106.

When the mask processing circuit 106 receives the synthesized data, it executes the dither process and mask process which will be explained hereinafter in step S5.

First, the notched mask edge portion due to the rough mask due to the mask data 51 in the synthesized data 50 is smoothed. FIGS. 16A to 17 show the details of a smoothing circuit in the mask processing circuit 106.

In FIG. 16A, reference numerals 23a and 23b denote shift registers A and B each having the capacity of one line of the image data; and 22a to 22f are pixel delay elements. The synthesized data 50 which was input from a terminal 24 is delayed by one line by a shift register A 23a and further delayed by one line by the shift register B 23b, so that the synthesized data 50 as much as three lines is simultaneously output. The outputs of the respective lines are further delayed by the one-pixel delay elements 22a to 22f, respectively. Therefore, the pixel data in the matrix of 3×3 shown in FIG. 16B is simultaneously fetched from terminals 21a to 21i. The mask processing circuit is provided for each of nine bits of the synthesized data. The image data 52 is subjected to the dither process and the like using the output by a well-known method.

The mask data 51 is subjected to the edge smoothing process using the data of eight bits excluding the output 21e among the outputs 21a to 21i of the mask processing circuit.

This edge smoothing process is executed by the circuit shown in FIG. 17. Namely, the mask data 51 of eight pixels excluding the central pixel 21e of the matrix of 3×3 of the outputs 21a to 21i is input to a look-up table memory (hereinafter, abbreviated to an LUT) 61 which is constituted by the ROM shown in FIG. 17. The mask data corresponding to the input of the central pixel of one bit corresponding to the input data is output. Thus, the notched mask data is corrected and becomes the mask data having the smooth boundary portion. The output data ($a_0$) from a terminal 34 becomes the smoothed mask data which is the central pixel of the mask data of 3×3 and which is actually used in the mask process.

FIG. 18 shows the relation between the mask data of 3×3 and the mask data of the central pixel.

An example of the LUT 61 is shown in the following table.

FIGS. 19A to 19D show examples of the correction of the mask data due to the LUT 61.

TABLE

| OUTPUT | INPUT = 2¹ | | | | | | | |
|---|---|---|---|---|---|---|---|---|
| a o | a | b | c | d | f | g | h | i |
| 0 | 0 | 0 | 0 | 0 | 0 | 0 | 0 | 0 |
| 0 | 0 | 0 | 0 | 0 | 0 | 0 | 0 | 1 |
| 0 | 0 | 0 | 0 | 0 | 0 | 0 | 1 | 0 |
| 0 | 0 | 0 | 0 | 0 | 0 | 0 | 1 | 1 |
| 0 | 0 | 0 | 0 | 0 | 0 | 1 | 0 | 0 |
| 0 | 0 | 0 | 0 | 0 | 0 | 1 | 0 | 1 |
| 0 | 0 | 0 | 0 | 0 | 0 | 1 | 1 | 0 |
| 0 | 0 | 0 | 0 | 0 | 0 | 1 | 1 | 1 |
| 0 | 0 | 0 | 0 | 0 | 1 | 0 | 0 | 0 |
| 0 | 0 | 0 | 0 | 0 | 1 | 0 | 0 | 1 |
| 0 | 0 | 0 | 0 | 0 | 1 | 0 | 1 | 0 |
| 0 | 0 | 0 | 0 | 0 | 1 | 0 | 1 | 1 |
| . | . | . | . | . | . | . | . | . |
| . | . | . | . | . | . | . | . | . |
| . | . | . | . | . | . | . | . | . |
| 1 | 0 | 0 | 1 | 0 | 1 | 1 | 1 | 1 |
| . | . | . | . | . | . | . | . | . |
| . | . | . | . | . | . | . | . | . |
| 1 | 0 | 1 | 1 | 0 | 1 | 0 | 1 | 1 |
| . | . | . | . | . | . | . | . | . |
| . | . | . | . | . | . | . | . | . |
| 1 | 1 | 1 | 1 | 1 | 1 | 1 | 1 | 0 |
| 1 | 1 | 1 | 1 | 1 | 1 | 1 | 1 | 1 |

Figures 19A, 19B, 19C, 19D, 20:
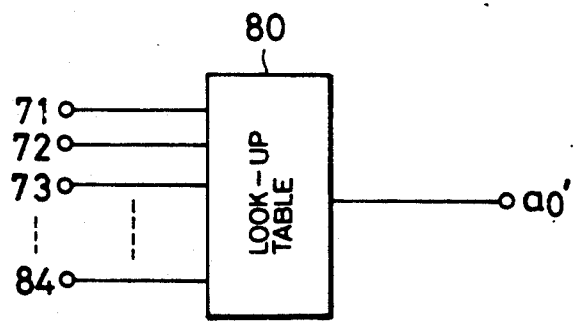
FIGS. 19A to 19D are diagrams showing examples of matrices for the mask smoothing process of the first embodiment.
FIG. 20 is a detailed diagram of the mask processing circuit of a matrix of 5×5 of the first embodiment according to the invention.

FIGS. 19A and 19B show the examples when the mask data ($a_0$) is "0". FIGS. 19C and 19D show the examples when the mask data ($a_0$) is "1".

All of the table values of 3×3 which can appear are included in the LUT 61 and the mask data of the central value is sequentially output.

Only the image data in the portion to be extracted in the image data 52 is output to the binarization processing circuit 107 in accordance with the smoothed mask data.

On the other hand, the processing circuit 107 binarizes this image data and converts to the one-bit data in step S6. The processing circuit 107 then expands the pattern on the bit map memory 108 in step S7. In step S8, a check is made to see if the patterns for all of the image data have been expanded or not. If NO in step S8, the processing routine is returned to step S1 and the next image data will be processed. If YES in step S8, the processing routine ends.

Figure 12:
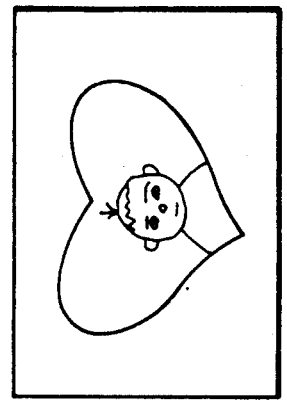
FIG. 12 is a diagram showing an image which was pattern expanded in a bit map memory after performing the extracting process on the original image shown in FIG. 11.

Due to the above processes, the extracted pattern as shown in FIG. 12 having the smooth boundary portion is expanded on the bit map memory 108.

Although the matrix of 3×3 has been described in the above embodiment for smoothing, if there is no limitation of the hardware, by use of a further large matrix, the boundary portion of the mask data is further effectively smoothed.

In the case of using the matrix of 5×5, the circuit shown in FIG. 16A in the matrix of 3×3 also needs to be designed in accordance with the matrix of 5×5. In such a case, it is sufficient to use four shift registers and twenty one-pixel delay elements shown in FIG. 16a. In addition, the LUT 61 shown in FIG. 17 is also enlarged in association therewith. FIG. 20 shows an arrangement of an LUT in the case of using the matrix of 5×5. In this case, the number of input bits as ROM addresses of an LUT 80 also becomes $2^4$ (71 to 84 in FIG. 20).

As described above, with an increase in averaging matrix, the smoothing function is further enhanced. However, the numbers of one-pixel delay elements, shift registers, and the like increase, the constitution also becomes complicated, and the cost fairly rises. However, the cost of hardware can be relatively reduced by use of the method whereby the dimension is enlarged only in the main scanning direction (i.e., the horizontal direction of the raster).

Therefore, it is sufficient to properly select the optimum matrix in accordance with desired smoothing conditions.

As described above, according to the first embodiment, the mask process to extract a part of an image can be performed with the constitution of the mask bit map memory of a small capacity and at the same time, it is also possible to provide a high quality extracted image which can eliminate the situation that the boundary portion is notched due to the operation of the enlargement or the like of the image.

Second Embodiment

The second embodiment of the present invention will now be described. The second embodiment extracts an image due to a plurality of mask data.

Outline of the Second Embodiment

Figure 21:
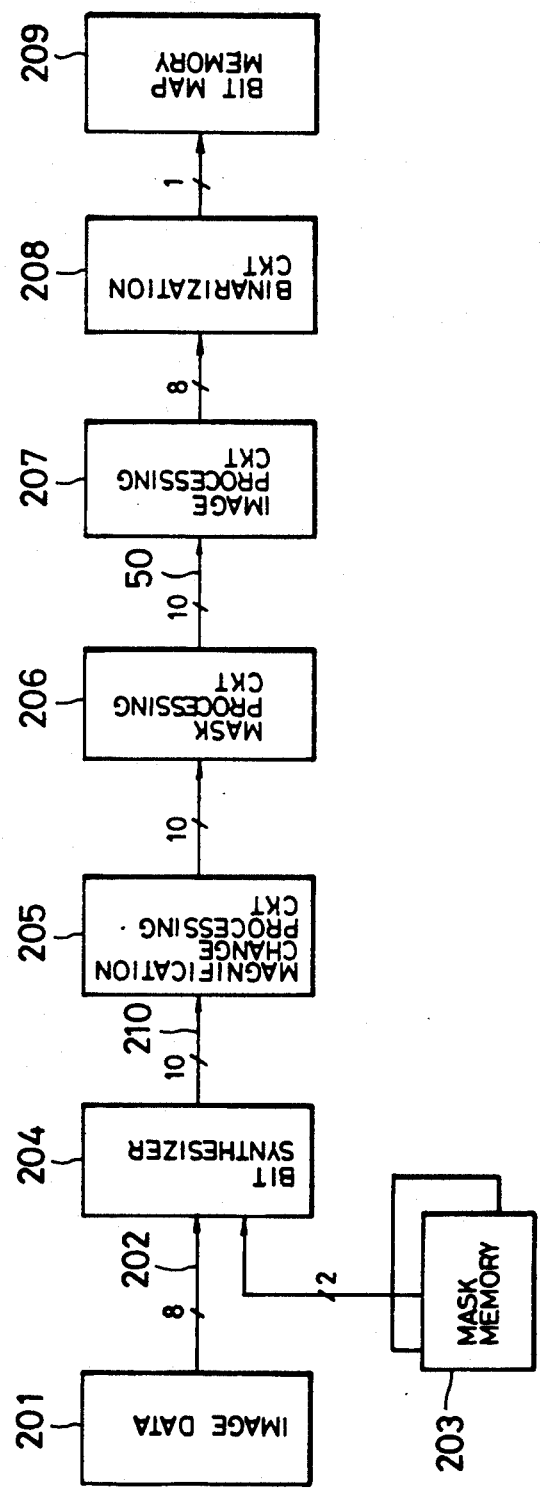
FIG. 21 is a schematic block diagram of an image data processing apparatus of the second embodiment.

In an arrangement of FIG. 21, Two-bit mask data is added to the input image data of eight bits and the image data of ten bits is produced by a bit synthesizer 204. The image data is subjected to the process such as enlargement, reduction, or the like by a magnification change processing circuit 205. On the other hand, the two-bit mask data is converted for smoothing by a mask processing circuit 206. An image processing circuit 207 performs the mask process for a plurality of images in accordance with the mask data transmitted from the mask processing circuit 206 and selects and outputs the image and synthesizes a plurality of images. The image processing circuit 207 allows the image data to be stored in a bit map memory 209 through a binarization circuit 208.

Detailed Description of the Block Diagram of FIG. 21

Figure 22:
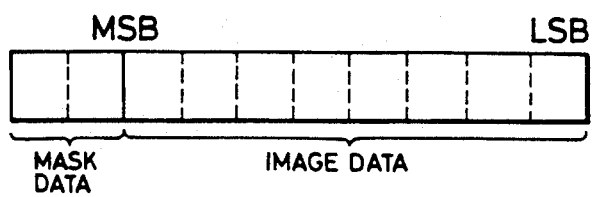
FIG. 22 is a diagram showing an example of image data to which mask data was added.

FIG. 21 shows a block diagram of an image data processing apparatus of the second embodiment. Image data 201 is an eight-bit data of which time-sequential image data read out of, e.g., a TV camera, CCD sensor, or the like was A/D converted. Such image data 201 is sequentially input as raster image data 202 and synthesized with a two-bit output data from a mask memory 203 by the bit synthesizer 204, so that ten-bit data as shown in FIG. 22 is obtained.

In FIG. 21, each numeral written on the line denotes the number of bits.

Figure 23A:
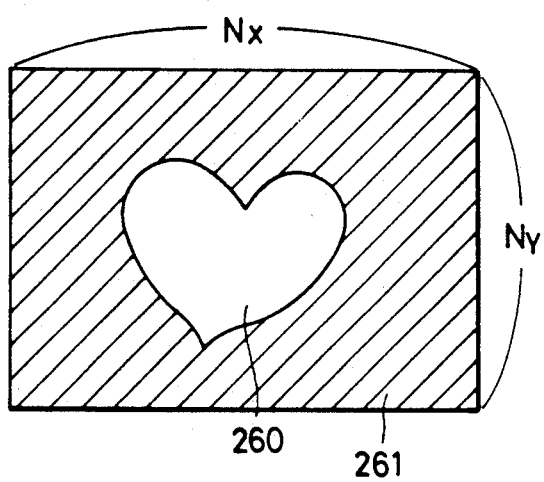
FIGS. 23A and 23B are diagrams showing examples of the contents of the mask memory.
Figure 23B:
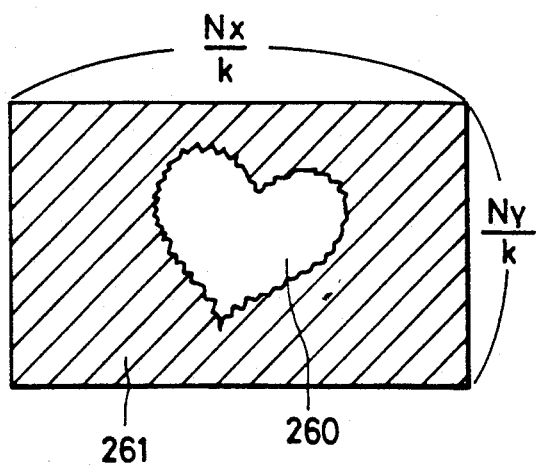

FIGS. 23A and 23B are diagrams showing examples of the contents of the mask memory 203. All of the data in the extracted portion of a heart-shaped inner region 260 are "1" and all of the data in the mask portion of a hatched region 261 are "0". FIG. 23A shows the ordinary mask data of $N_x \times N_y$ pixels FIG. 23B shows a diagram in the case where the mask data of FIG. 23A was thinned out to 1/k in the x and y directions. In this case, the memory capacity is reduced to $1/k^2$ than that of FIG. 23A.

For the data fetching timing from the mask memory 203, the data is taken out on a $(k \times k)$-pixel unit basis of the image data since the mask data was thinned out to 1/k in each of the x and y direction. The content of the mask memory 203 is constituted by "0" or "1". In the case of "0", the fetching of the image data is inhibited (the writing of the image data into the bit map memory 209, which will be explained hereinafter, is inhibited). In the case of "1", the writing of the image data into the bit map memory 209 is permitted.

As mentioned above, the raster image data 202 and mask data are synthesized by the bit synthesizer 204 to form the ten-bit data of which the mask data was written to the most significant two bits as shown in FIG. 22. One mask data is repeatedly added to the image data of $k \times k$ pixels as mentioned above.

Bit synthesized image data 210 is converted by the magnification change processing circuit 205 at the post stage with a variable magnification of the image, namely, it is enlarged, reduced, or the like. The case of enlarging the image will now be described. For example, in the case of tripling in the vertical and lateral directions, the same three pixels of the raster output image data are successively output in the main scanning direction and the same line data of three lines is output in the sub scanning direction. For this purpose, it is assumed that the output of the image data can be paused for each line.

After completion of the magnification changing process by the processing circuit 205, the mask data of two bits in the ten-bit image data is used to smooth the mask edge portion by the mask processing circuit 206, thereby smoothing the notched edge of the image due to the rough mask. Therefore, the transparency process in the overlap portion of two masks and the like are executed by the image processing circuit 207. Thereafter, the image data is binarized by the binarization circuit 208 due to a dither method or the like. The resultant data is stored into the bit map memory 209.

Figure 24A:
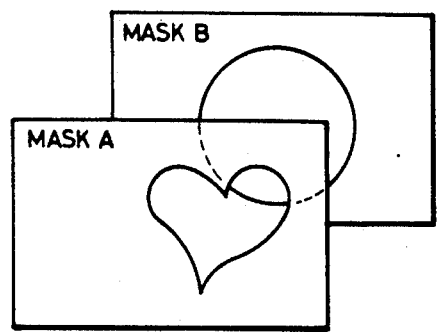
FIGS. 24A and 24B are diagrams showing examples of an arrangement of a mask memory.
Figure 24B:
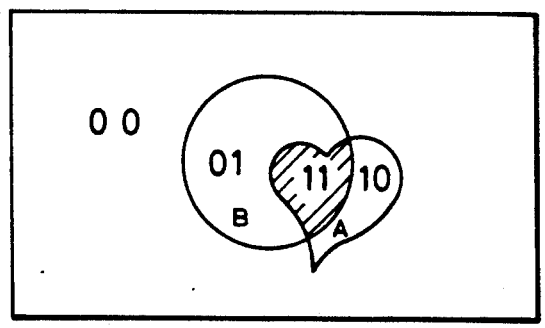

Explanation of an Arrangement of the Mask Memory FIGS. 24A and 24B

FIG. 24A shows the mask memory 203 having two mask data consisting of the masks A and B. Each mask has a bit map memory constitution of a depth of one bit. However, it is convenient to encode the mask data and handle it as a two-bit mask memory in consideration of the overlap image as shown in FIG. 24B. Namely, as shown in FIG. 24B, the code data of "00" (writing into the memory is inhibited), "01" (only the image B), "10" (only the image A), and "11" (transparency of the images A and B) are assigned to the mask data.

Explanation of the Mask Smoothing Circuit (FIGS. 25A, 25B, 26A, 26B

Figure 25A:
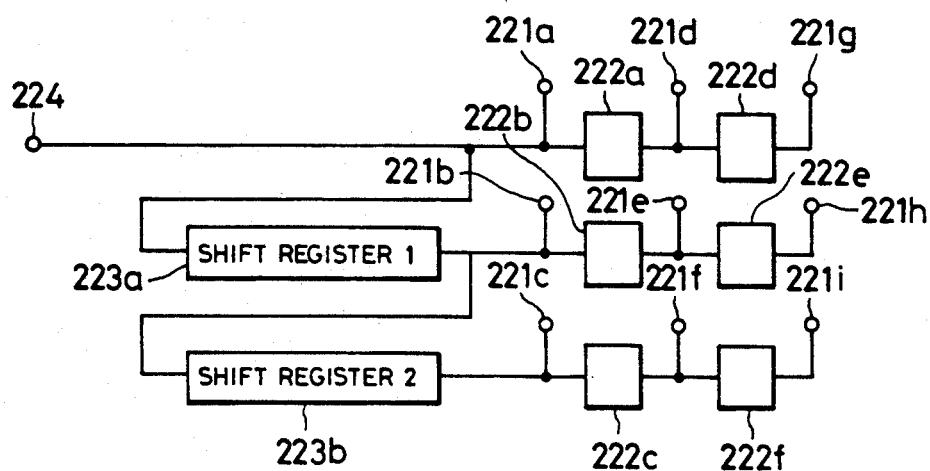
FIGS. 25A and 25B are block diagrams of a mask smoothing circuit.
Figure 25B:
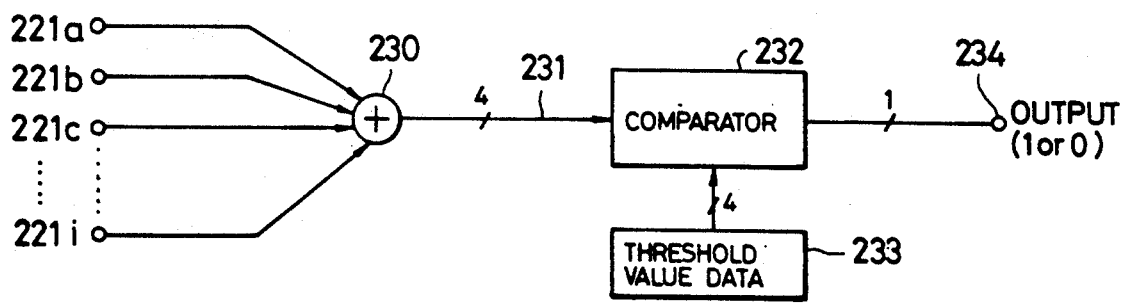

FIGS. 25A and 25B are block diagrams of the mask smoothing circuit. The case where the mask data of one bit will be described for simplicity.

In FIG. 25A, the image data input to an input terminal 224 is delayed by an amount of one line at a time by shift registers 223a and 223b, respectively, and the mask data of three lines is simultaneously output. The outputs of the respective lines are delayed by one-pixel delay elements 222a to 222f. Therefore, the image data in the matrix of $3 \times 3$ is simultanesouly fetched from taps 221a to 221i.

FIG. 25B is a block diagram of the conversion of the mask data 221a to 221i of $3 \times 3$ which are generated on the basis of the mask data of one bit.

Nine mask data 221a to 221i are added by an adder 230 and output as four-bit data 231 having a range of 0 to 9. The added data 231 is compared with a predetermined threshold value data 233 by a comparator 232 at the post stage and binarized. This binarized data is output as data 234. The threshold value data 233 can be properly set by a manual method or the like. (The smoothing characteristic slightly varies by changing the threshold value data 233.) Thus, the binarized output 234 is derived.

FIG. 26A shows the state before the mask process is performed in the case where the mask data is one bit FIG. 26B shows the processed mask data.

In FIG. 26A, the hatched region indicates "0" (i.e., the portion to be masked). Actually, it is expected to mask along an oblique line 70 at an angle of inclination of 45°. However, the mask is enlarged due to the rough mask data, magnification changing function (enlarging function), or the like, so that the hatched region is roughly notched as shown in the diagram.

FIG. 26B is a diagram showing the result of the process. Each numeral represents the result 231 of the addition of the mask data due to the matrix of $3 \times 3$. When the threshold value data 233 is now set to 5 and it is determined that $$\text{data} \geq 5 \rightarrow \text{output} = 1 \text{ and}$$

$$\text{data} < 5 \rightarrow \text{output} = 0.$$

the hatched region in FIG. 26B becomes 0. Thus, the oblique edge portion approaches the line 70 and is more naturally smoothed. Consequently, the boundary portion of the masked and extracted image is seen as a smooth line.

Although the explanation has been made with respect to the matrix of $3 \times 3$ in the second embodiment, if there is no limitation in hardware and the like, by use of a further large matrix, the smoothing function can be further enhanced.

Explanation of Other Matrices (FIGS. 27A to 27C

FIG. 27A is a diagram showing an example of a matrix of $5 \times 5$. Each element of this matrix is added by a weight 1 (i.e., all elements are equivalently added), so that the result of the addition becomes the value of six bits of 0 to 25. Therefore, the circuits at the post stage also need to be designed in accordance with it.

FIG. 27B is a diagram showing an example of an averaging matrix in which the central pixel of the matrix of $3 \times 3$ is weighted. The averaging scan is performed by putting emphasis on the value of the center.

FIG. 27C is a diagram showing an example of an averaging matrix other than a square. As mentioned above, the smoothing function is enhanced as the size of averaging matrix is enlarged. However, the numbers of line memories (or shift registers) and the like increase and the cost considerably rises. On the other hand, by use of the matrix as shown in these diagrams of which the dimension in only the main scanning direction (horizontal direction of the raster) is increased, there is the advantage such that, for example, the cost of hardware is reduced since it is sufficient to merely add the delay elements in the main scanning direction.

Figure 28:
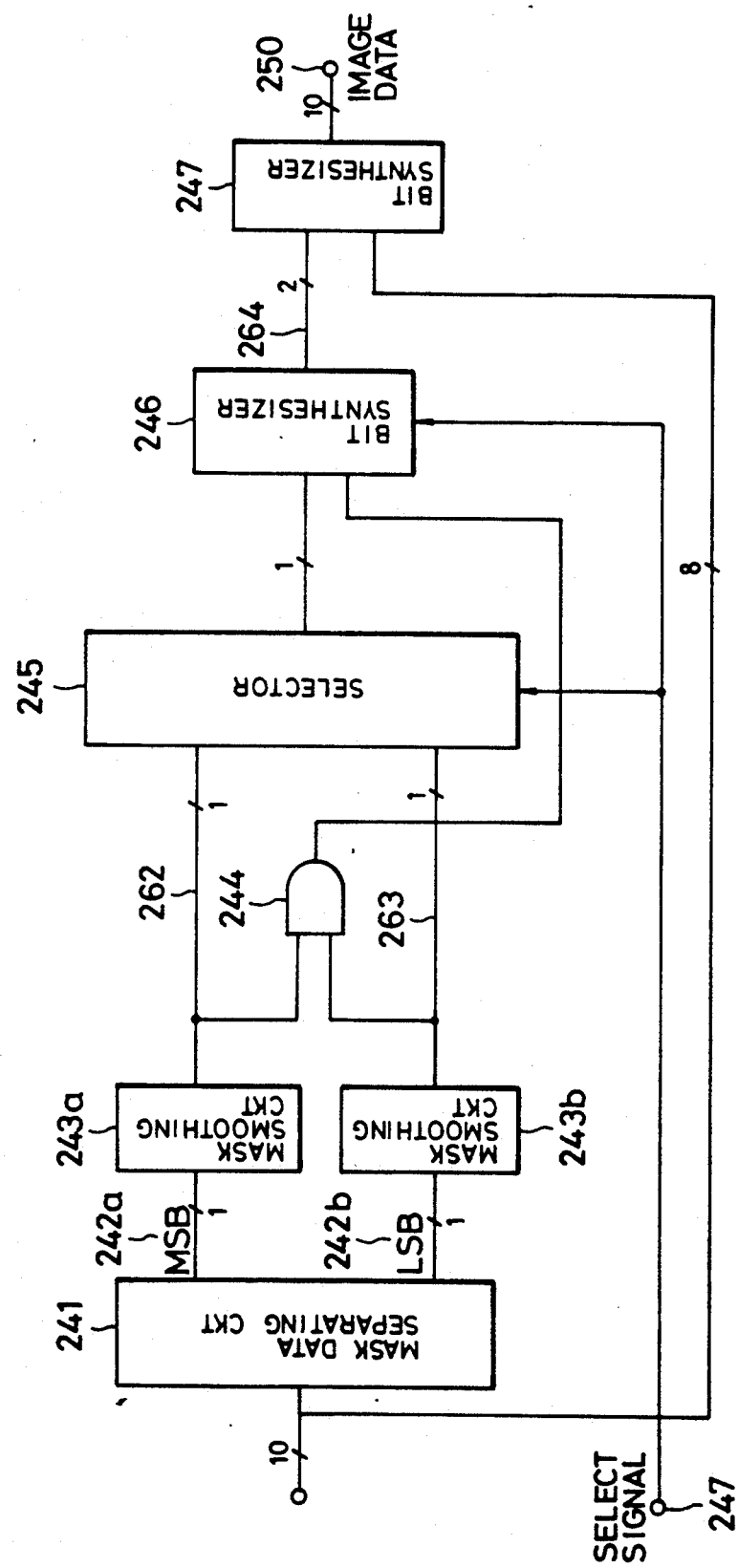
FIG. 28 is a block diagram of a mask processing circuit.

Explanation of the Mask Processing Circuit 206 (FIG. 28)

FIG. 28 is a block diagram of the mask processing circuit 206 in this embodiment and shows the case where the mask data is two bits.

Since the mask data is two bits, four states of "00", "01", "10", and "11" can be provided as mentioned before. A consideration will now be made with respect to the case where this data is separated to the upper bits and lower bits. When only the upper bits are 1, the mask data indicates the mask region of the image A. When only the lower bits are 1, the mask data represents the mask region of the image B. FIG. 28 shows the circuit to simultaneously smooth such two mask regions. In this circuit, the mask data of upper two bits in the ten-bit image data is separated by a mask data separating circuit 241. The MSB and LSB (242a, 242b) of such two-bit mask data are smoothed by mask smoothing circuits 243a and 243b at the next stage, respectively. The mask smoothing circuits 243a and 243b are the same as the one-bit mask smoothing circuit shown in FIGS. 25A and 25B.

Either one of two smoothed mask data 262 and 263 is selected by a selector 245 in response to a selection signal 247. On the other hand, the overlap portion of two masks is detected by an AND circuit 244. An output of the selector 245 and an output of the AND circuit 244 are synthesized by a bit synthesizer 246 and again converted to smoothed mask data 264 of two bits.

On the basis of the selection signal 247, the bit synthesizer 246 determines which one of the one-bit mask data from the selector 245 and the output from the AND circuit 244 is set to the MSB in dependence on the image A or B. For this purpose, a decoder is included in the bit synthesizer 246. Thereafter, the image data is added to lower eight bits by a bit synthesizer 247, thereby obtaining image data 250 of ten bits.

Explanation of a Block Diagram of the Image Processing circuit (FIG. 28)

Figure 29:
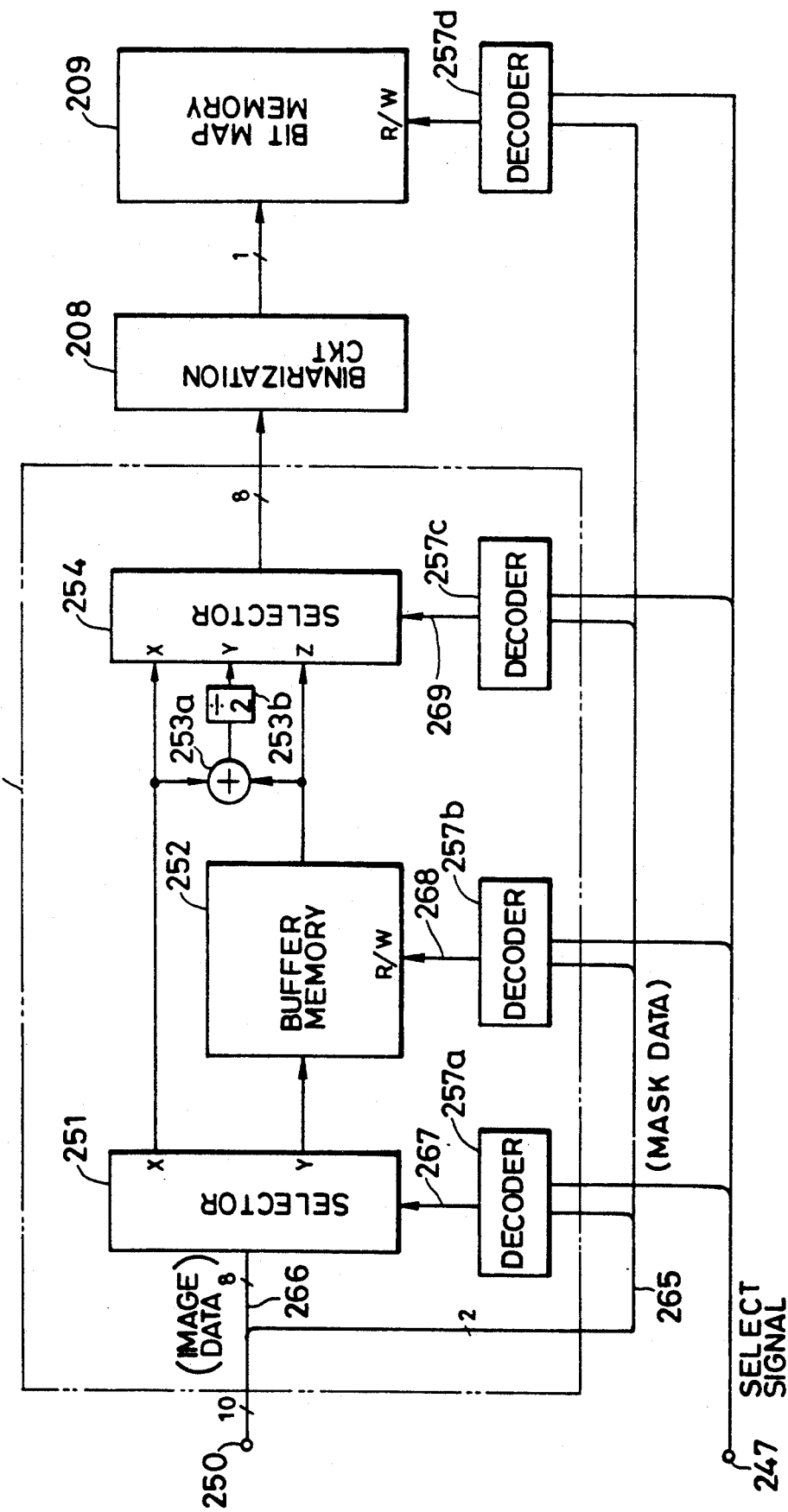
FIG. 29 is a block diagram of an image processing circuit.

FIG. 29 shwos the details of the image processing circuit 207 and the connection with the circuits at the post stage.

The ten-bit image data 250 is again separated to two-bit mask data 265 and eight-bit image data 266. The image data 266 is input to a selector 251. In the case of the mask data of the first image A, the selector 251 selects X by a signal 267 from a decoder 257a when the mask data 265 is "10", namely, when there is no overlap portion. When the mask data 265 is "11" indicating that there is an overlap portion, Y is selected and the image data 266 is output to a buffer memory 252. At this time, a decoder 257b generates an read/write (R/W) signal 268 at a low level to the buffer memory 252, thereby instructing the image data 266 to be written into the memory 252. A selector 254 at the post stage selects X by a signal 269 from a decoder 257c when the mask data 265 is "10". The image data input from the X is transmitted to the binarization circuit 208 at the next stage. When the mask data 265 is "11", none of inputs X, Y, and Z of the selector 254 is selected, so that no data is output to the binarization circuit 208.

Next, in the case of the second imge B, when the mask data is "01", the terminals X in the selectors 251 and 254 are selected, so that the image data 266 is stored in the bit map memory 209 through the binarization circuit 208. When the mask data 265 is "11", the terminals X and Y in the selectors 251 and 254 are respectively selected and at the same time, the R/W signal 268 at a high level is supplied to the buffer memory 252. Thus, the data previously stored in the region of the image A (region "11" in FIG. 24B) is read out.

The image data output from the terminal X of the selector 251 and the data supplied from the buffer memory 252 are added by an adder 253a. The result of the addition is reduced into $\frac{1}{2}$ by a divider 253b to obtain the average of those two data (this process can be realized by merely shifting the data by one bit). The resultant divided data is input to a terminal Y of the selector 254 and supplied to the binarization circuit through the selector 254 and binarized. The binarized data is stored into the bit map memory 209. The above description will be summarized as shown in the following table.

TABLE

|  | MASK DATA | CONTENT OF PROCESS |
|---|---|---|
| First time | "00" | Inhibit the writing into the bit map memory. |
| (Image A) | "10" | Write into the bit map memory. |
| (Selection signal: L) | "11" | Write into the buffer memory. |
| Second time | "00" | Inhibit the writing into the bit map memory. |
| (Image B) | "01" | Write into the bit map memory. |
| (Selection signal: H) | "11" | Write the average data of the read data from the buffer memory and the image data into the bit map memory |

Decoders 257a to 257d make control signals to control the selectors 251 and 254, buffer memory 252, and bit map memory 209 in accordance with the mask data (two bits) and selection signal 247. The selection signal 247 is the one-bit signal, for example, which becomes a low level in the case of the image data at the first time and a high level in the case of the image data at the second time.

In this embodiment, the order of the images at the first and second times may be also reversed. In this case, when the mask data 265 at the first time is "11", the data is written into the buffer memory 252 and at the second time, the data is read out of the buffer memory 252 and the averaging process is performed in a manner similar to the above.

Further, by setting the mask data 265 in the overlap portion to code data other than "11", for example, the Z input of the selector 254 is selected and the output of the buffer memory 252 is supplied to the binarization circuit 208 and the corresponding preferential image can be inserted.

Third Embodiment

Figure 30:
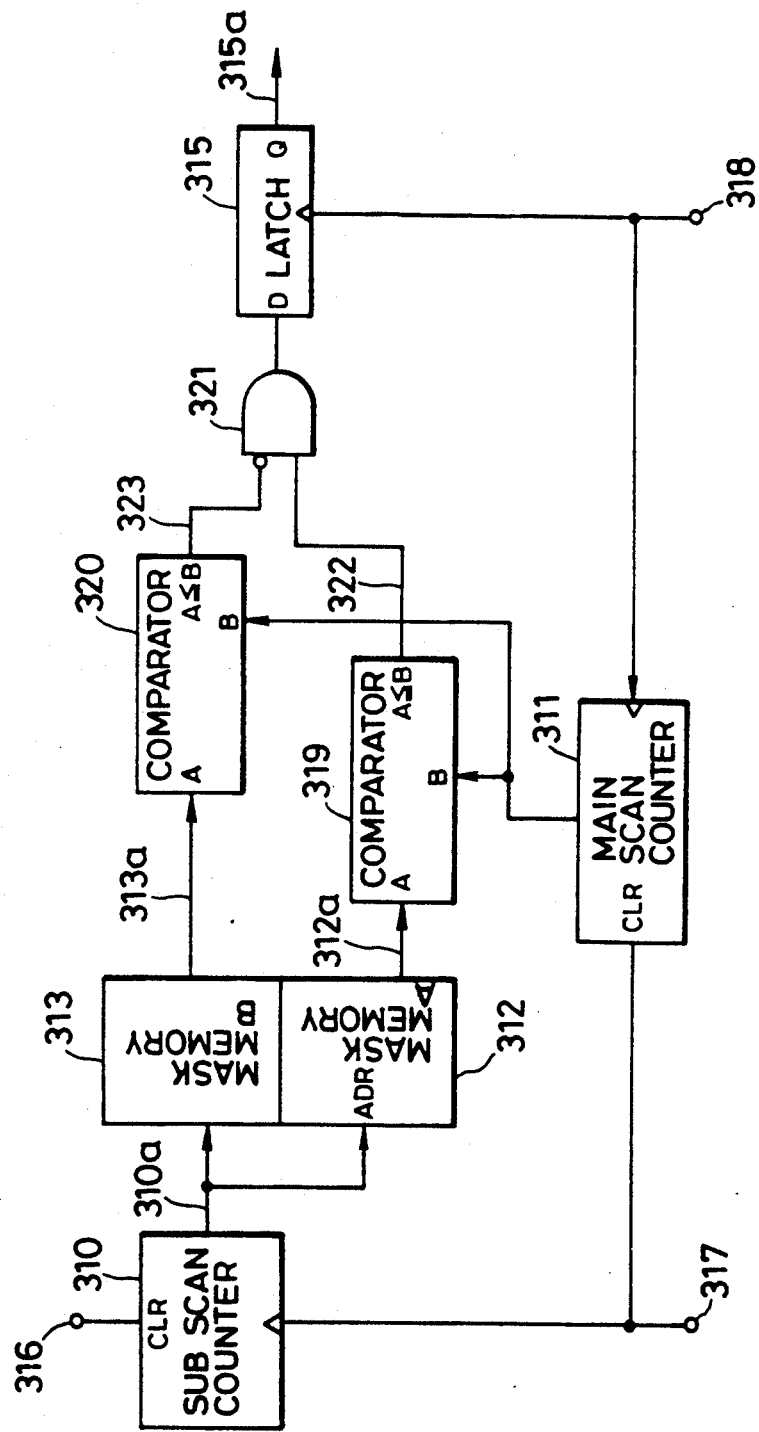
FIG. 30 is a block diagram for the mask process of the third embodiment of the invention.

FIG. 30 is a block diagram of the third embodiment according to the invention. In the diagram, reference numeral 310 denotes a sub scan counter; 311 is a main scan counter; 315 is a latch; 316 denotes an image start signal; 317 denotes a main scan start signal; and 318 denotes a pixel clock signal.

Further, numerals 312 and 313 denote mask memories A and B; 319 denotes a comparator A for comparing a value of data read out of the mask memory A 312 with a value of the main scan counter 311; 320 denotes a comparator B for comparing a value of the data read out of the mask memory B 313 with a value of the main scan counter 311; and 321 denotes a gate circuit.

Figure 1A:
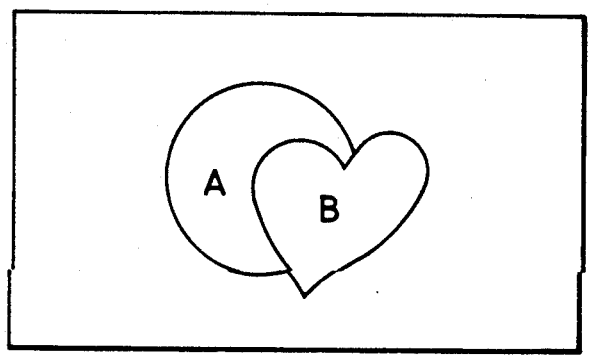
FIGS. 1A and 1B are diagrams showing examples of mask images.
Figure 1B:
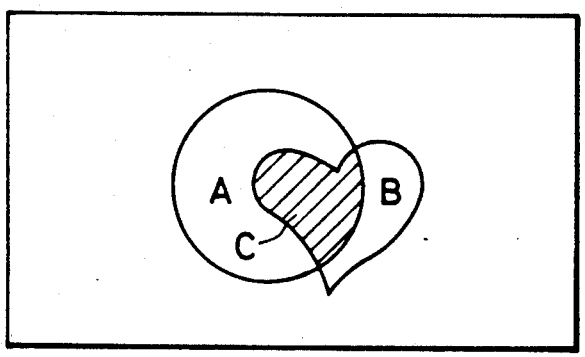
Figure 2A:
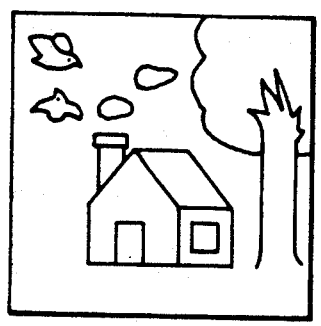
FIGS. 2A to 2C are explanatory diagrams of the mask process.
Figure 2B:
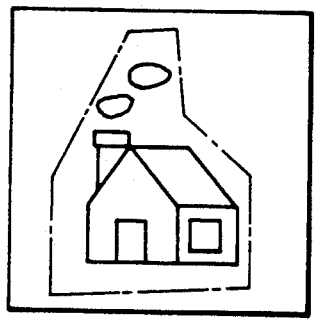
Figure 2C:
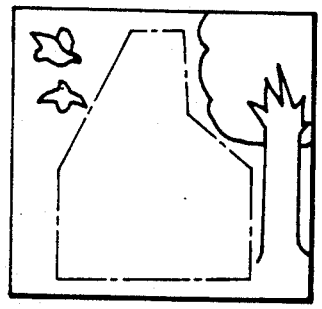
Figure 3:
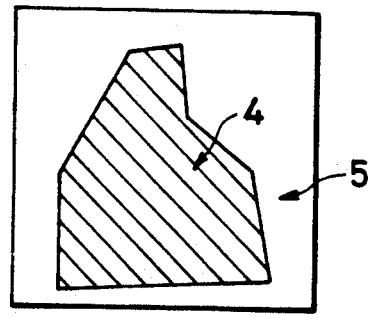
FIG. 3 is a diagram showing a mask pattern.
Figure 4:
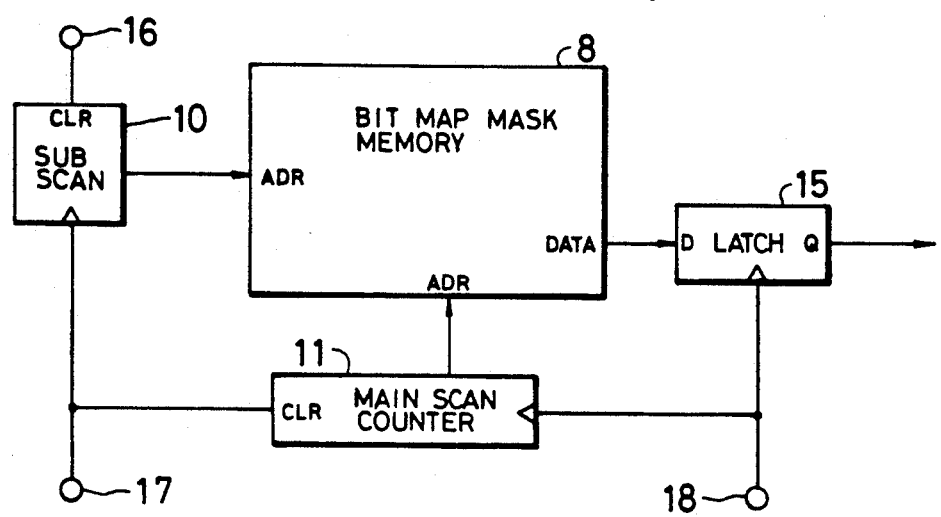
FIG. 4 is a constitutional diagram of a conventional mask pattern producing section.
Figure 31:
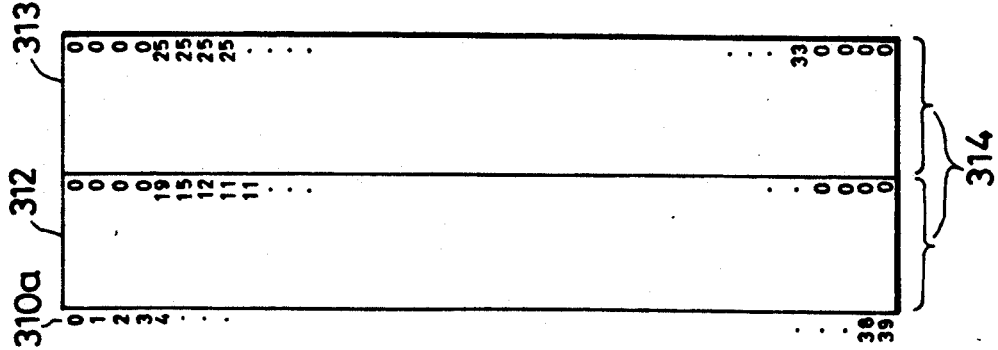
FIG. 31 is a diagram showing an example of the storage of the mask pattern shown in FIG. 3 according to the third embodiment.

FIG. 31 shows examples of arrangements (data stored) in the mask memories A and B (312 and 313) for the mask pattern shown in FIG. 3.

Figure 5:
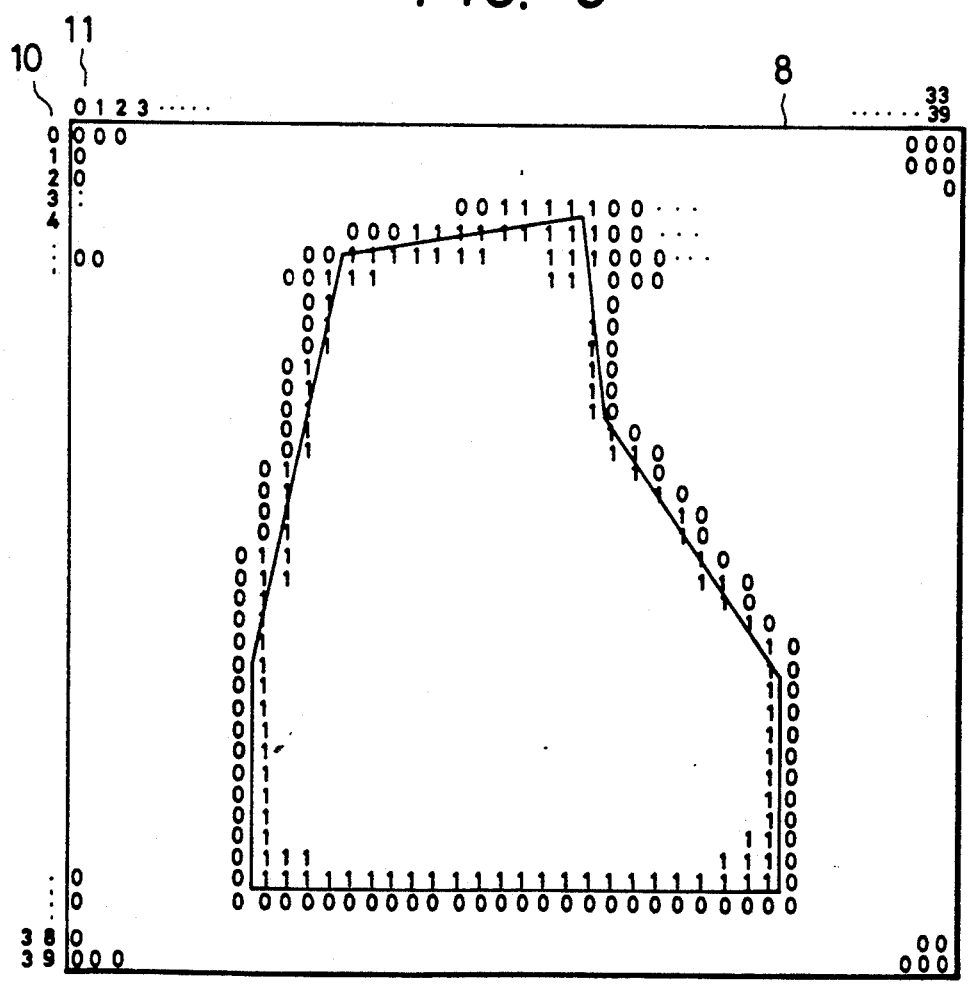
FIG. 5 is a diagram showing a conventional example of the storage by a bit map memory of the mask pattern shown in FIG. 3.
Figure 6:
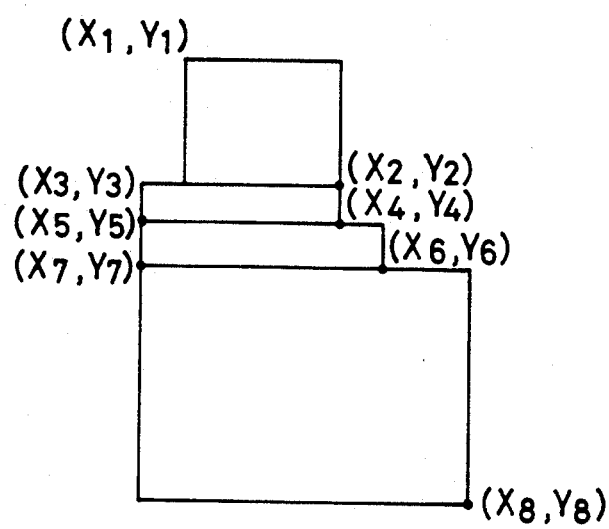
FIG. 6 is a diagram showing another conventional example of the production of rectangular mask patterns for the mask pattern shown in FIG. 3.
Figure 7A:
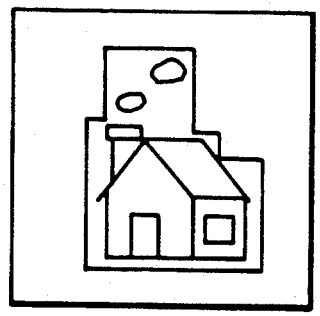
FIGS. 7A and 7B are diagrams showing conventional examples of the mask process due to the rectangular patterns.
Figure 7B:
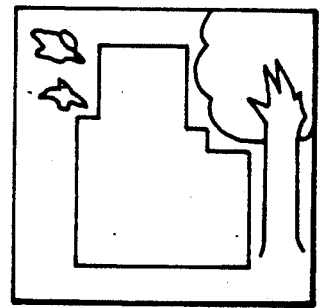

Each bit length shown at 314 is provided for each sub scan address 310a from the sub scan counter 310. The boundary data for the mask region is held. The main scan address to start the extraction is stored in the mask memory A 312. The main scan address to finish the extraction is stored in the mask memory B 313. For example, at sub scan address "4", it is shown that the extraction is started from main scan address "19" and the extraction ends at main scan address "25". Assuming that the capacity of the memory having the mask memory data of the bit map shown in FIG. 5 is 1 Mbits, for this boundary data, even if the bit length 314 is ten bits as well, the similar mask data can be stored by the capacity of total 20 Kbits. Thus, it is sufficient to use the capacity of 1/50.

In the case where the image data was resolved at a rate of 16 dots/mm of the A4 size, the number of pixels of the image becomes 4752×3360 and the total number of bits in the bit map memory becomes about 16 Mbits. However, according to the embodiment, twelve bits are enough for the bit length per word and a capacity of about total 114 Kbits is sufficient. Therefore, this memory capacity is about 1/140 as compared with that of the bit map mask memory.

On the other hand, outputs 322 and 323 as the results of the comparison by the comparators A and B (319 and 320) are input to a gate circuit 321 An output of the gate circuit 321 is further latched into the latch 315. The values to be latched into the latch 315 satisfy the following relations.

(output value 312a of the mask memory A) ≦ (value of the main scan counter) and
(output value 313a of the mask memory B) > (value of the main scan counter)

These relations can be also expressed as follows.

(main scan address to start the extraction) ≦ (value of the main scan counter) and
(main scan address to finish the extraction) > (value of the main scan counter)

Therefore, by executing the mask process in dependence on "1" or "0" of an output 315a of the latch 315, the mask process of a quality equal to that of the mask memory of the smooth bit map can be performed at high speed due to the addition of a small circuit arrangement of merely two comparators and one gate circuit without needing any bit map memory of a large capacity.

Fourth Embodiment

Although the above-described embodiments relate to the simplest constitution, another different embodiment according to the present invention will now be described hereinbelow.

In the third embodiment shown in FIGS. 30 and 31, only the single on/off operation is permitted in the main scanning direction (for a single sub scan), so that it is impossible to cope with the case of a complicated extraction figure.

Figure 32:
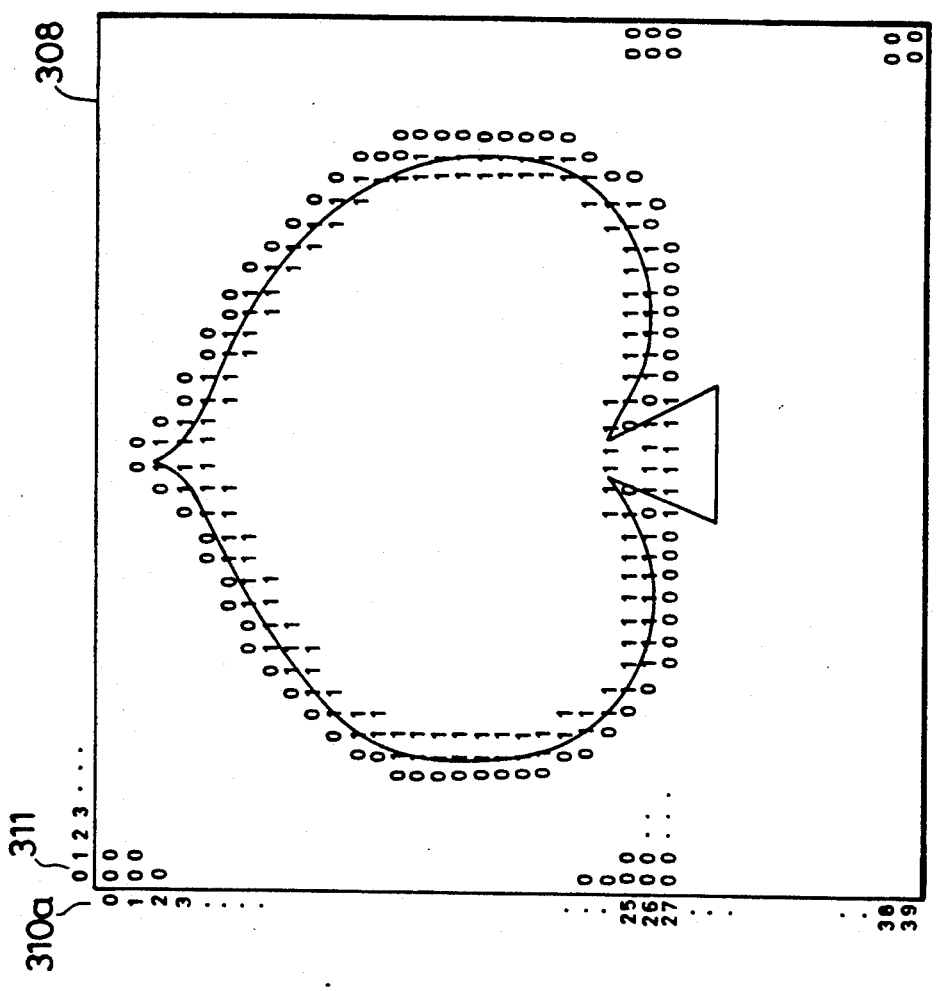
FIG. 32 is a diagram showing another mask pattern expressed by a bit map.

For example, the same pattern as the bit map mask shown in FIG. 32 cannot be produced. This is because the on/off operation is respectively repeated three times in the 25th and 26th sub scans.

Figure 33:
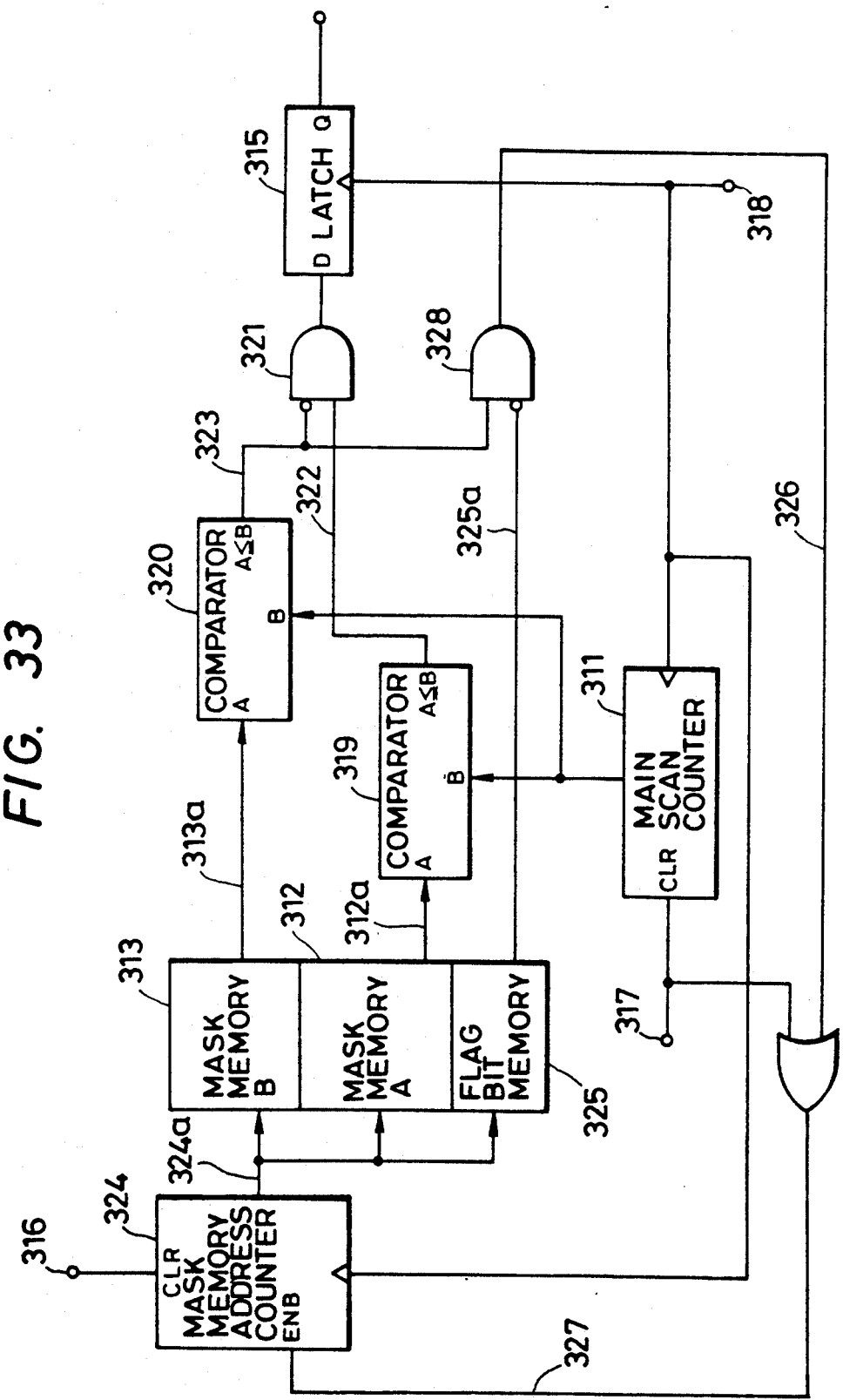
FIGS. 33, 36 and 39 are block diagrams of the other fourth, fifth and sixth embodiments according to the present invention.
Figure 34:
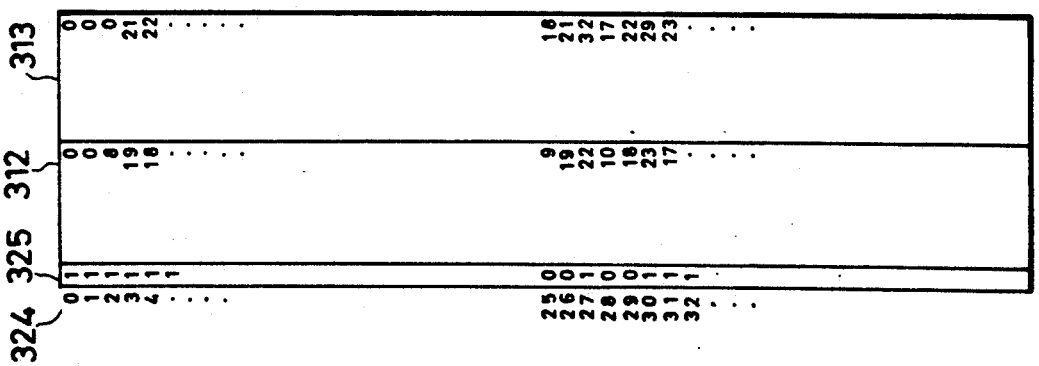

Generally, only the mask in the convex region can be handled by the structure of FIG. 30. Therefore, to handle the mask of an arbitrary shape, as shown in FIGS. 33 and 34, the mask memory is properly expanded in the direction of address by only a necessary amount and expanded in the direction of work length by one bit. To the sub scan in which the on/off operations are repeated, the words as many as the number of times of the on/off operations to be repeated are assigned. A bit indicating whether the subsequent work is for the same sub scan or not is assigned to one expanded bit.

FIG. 33 is a block diagram of the fourth embodiment, in which the same parts and elements as those shown in FIG. 30 are designated by the same reference numerals.

Different from the sub scan counter 310 in FIG. 30, a mask memory address counter 324 in FIG. 33 outputs a mask memory address 324a which does not correspond to the sub scan in a one-to-one corresponding manner. A memory for the mask data is constituted by the mask memory A 312, mask memory B 313, and a flag bit memory 325 to discriminate whether two words in the subsequent mask memories A 312 and B 313 are for the same sub scan or not. A gate circuit 328 is also added.

FIG. 34 shows an example in which the bit map mask pattern shown in FIG. 32 was stored into the mask memories A 312 and B 313 and flag bit memory 325.

When the mask memory address 324a is "24" or less, the on/off operations of the mask region are performed once and the mask memory address counter 324 is also counted up one by one due to each sub scan (310a). However, when the value of the main scan counter 311 becomes "0" and the mask memory address 324a becomes the next value "25", the outputs of the mask memories A 312 and B 313 and flag bit memory 325 become "9", "18", and "0", respectively.

When the pixel clock signal 318 rises, the main scan counter 311 is sequentially counted up. When the value of the counter 311 becomes "9", both inputs A and B of the comparator A 319 become equal, so that the output 322 becomes "1". At this time, the input A (313) of the comparator B 320 is "13" and the input B is "9" and the output 323 is "0". Therefore, the output of the gate circuit 321 becomes "1", so that the latch 315 is set by the next pixel clock signal 318 and the output becomes "1" thereby allowing the subsequent image data to be output.

Further, when the pixel clock signal 318 is successively generated eight times, the value of the main scan counter 311 becomes "18" and both inputs of the comparator B 320 become equal, so that its output becomes "1". Thus, both inputs of the gate circuit 321 become "1". At this time, the gate circuit 328 is also satisfied and the latch 315 is reset by the next pixel clock signal 318, thereby informing the end of mask process. The mask memory address counter 324 is also counted up by one. Consequently, the value of the mask memory address counter 324 becomes "26" and the output values of the mask memories A 312 and B 313 and flag bit memory 325 become "19", "21", and "0", respectively. In a manner similar to the above, the latch circuit 315 is set and reset by the next pixel clock signals of "19" and "21" of the main scan counter 311. Thereafter, the mask memory address counter 324 is counted up.

Next, when the value of the counter 324 becomes "27", the values of the corresponding mask memories A 312 and B 313 and flag bit memory 325 become "22", "32", and "1", respectively. The latch 315 is set by the main scan address value "22" and reset by "32". In association with this, the output is also turned on and off. However, since the gate circuit 328 is not satisfied, the counter 324 is not counted up. The counter 324 is counted up only when a next main scan start signal 317 is received.

At this time, the sub scan address 310a is "26", but the value of the counter 324 is "28".

Figure 35:
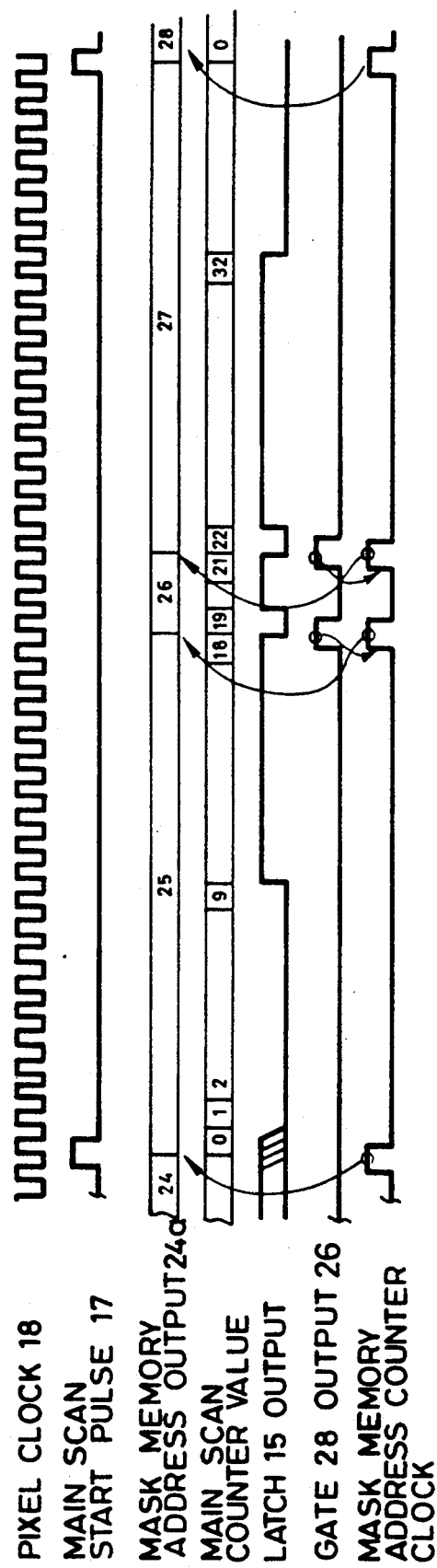
FIG. 35 is an operation timing chart of the fourth embodiment shown in FIG. 33.

The foregoing processing timing is shown in FIG. 35.

The same effect as the bit map mask shown in FIG. 31 can be obtained by use of the above constitution and by performing the foregoing processes.

In the constitution of this embodiment, if the number of on/off operation times of the mask per sub scan is 134 or less, as compared with the case where the bit map memory is used as a mask memory, the complicated mask process can be executed with less memory capacity.

Fifth Embodiment

Figure 36:
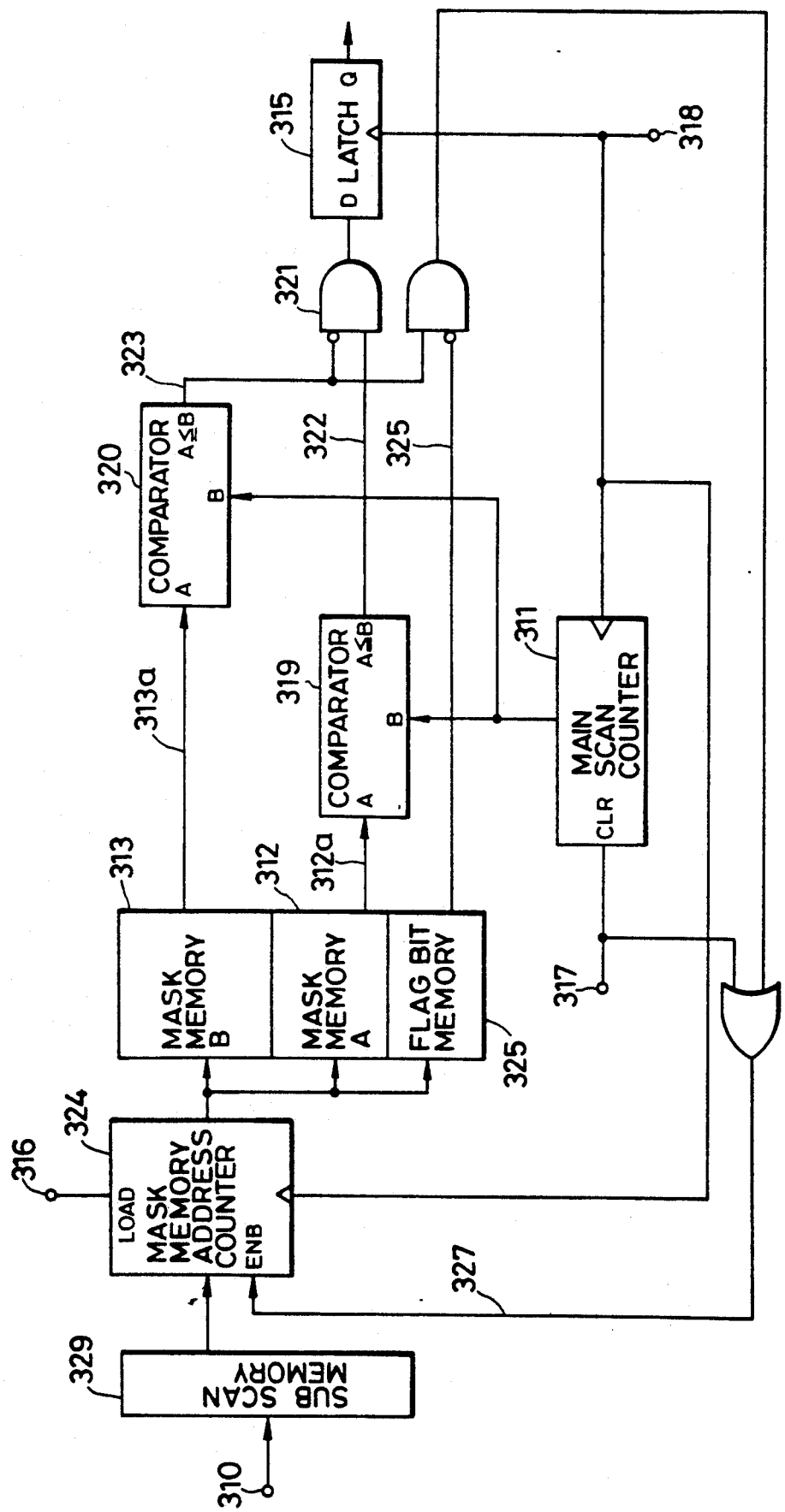

In the fourth embodiment, the sub scan address does not correspond to the memory address in a one-to-one corresponding manner. Therefore, it is difficult to start the processes from an arbitrary sub scan position. FIG. 36 shows a construction which can easily execute the mask process from an arbitrary sub scan position.

In FIG. 36, the same parts and elements as those shown in FIG. 33 are designated by the same reference numerals.

Figure 37:
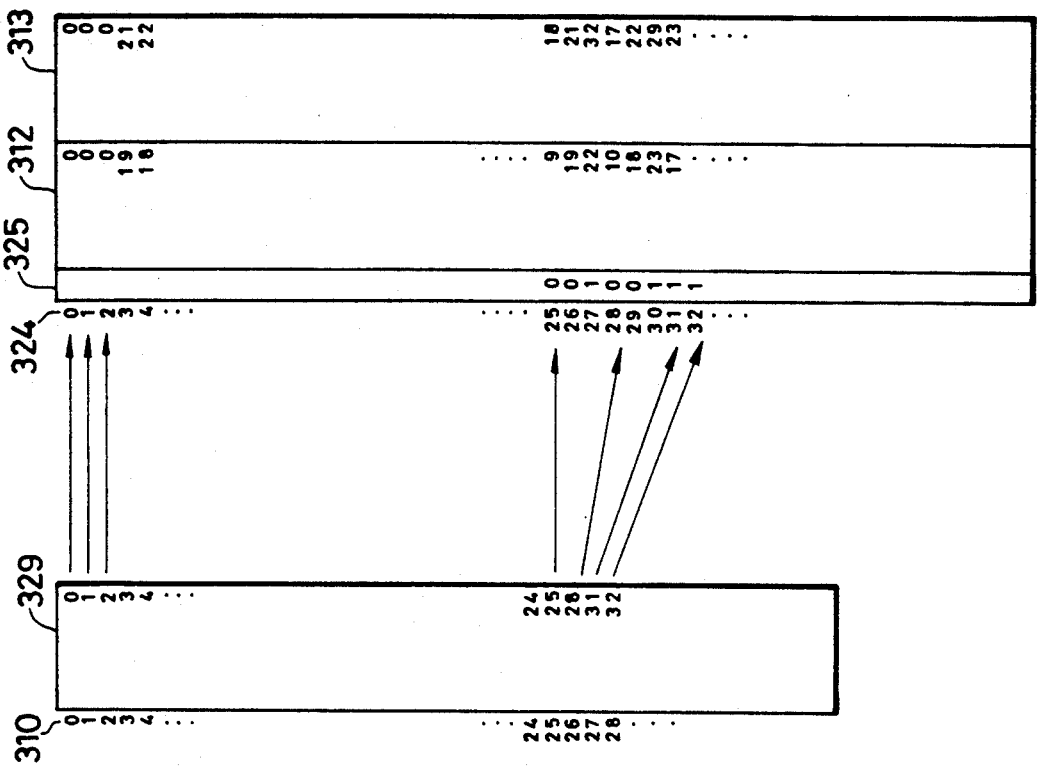
FIGS. 34, 37 and 38 are diagrams showing examples of the storage of the mask pattern shown in FIG. 31 according to the fourth, fifth and sixth embodiments.

In addition to the constitution of FIG. 33, a sub scan memory 329 having the address value which corresponds to the sub scan in a one-to-one corresponding relation is provided before the mask memory address counter 324, thereby allowing the mask data to be stored separately into two stages. FIG. 37 shows a detailed constitution of those mask data storing memories.

The content of the sub scan memroy 329 is read out by the sub scan address 310a and input to the counter 24 and loaded into the counter 324 in response to the reception of the image start signal 316. The same processes as those in the fourth embodiment shown in FIG. 33 are subsequently executed. Therefore, the mask data can be read out due to an arbitray sub scan.

Sixth Embodiment

Figure 38:
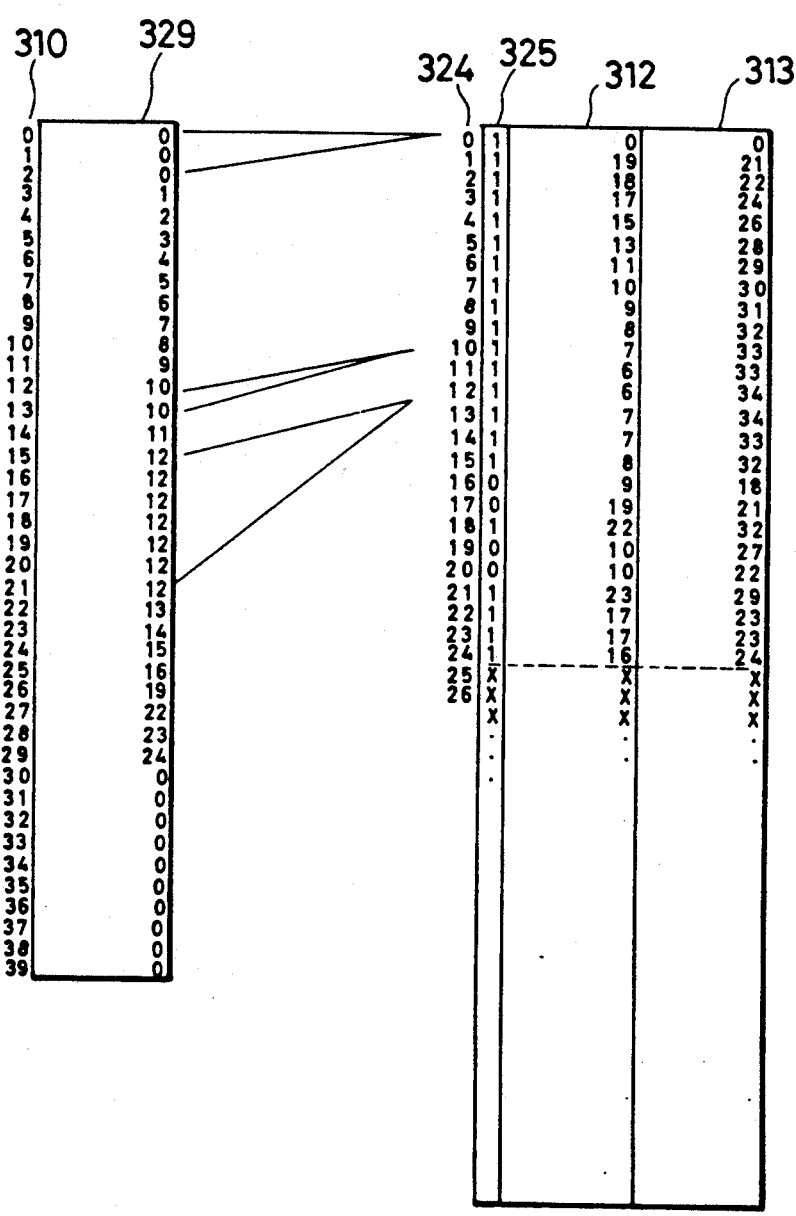
Figure 39:
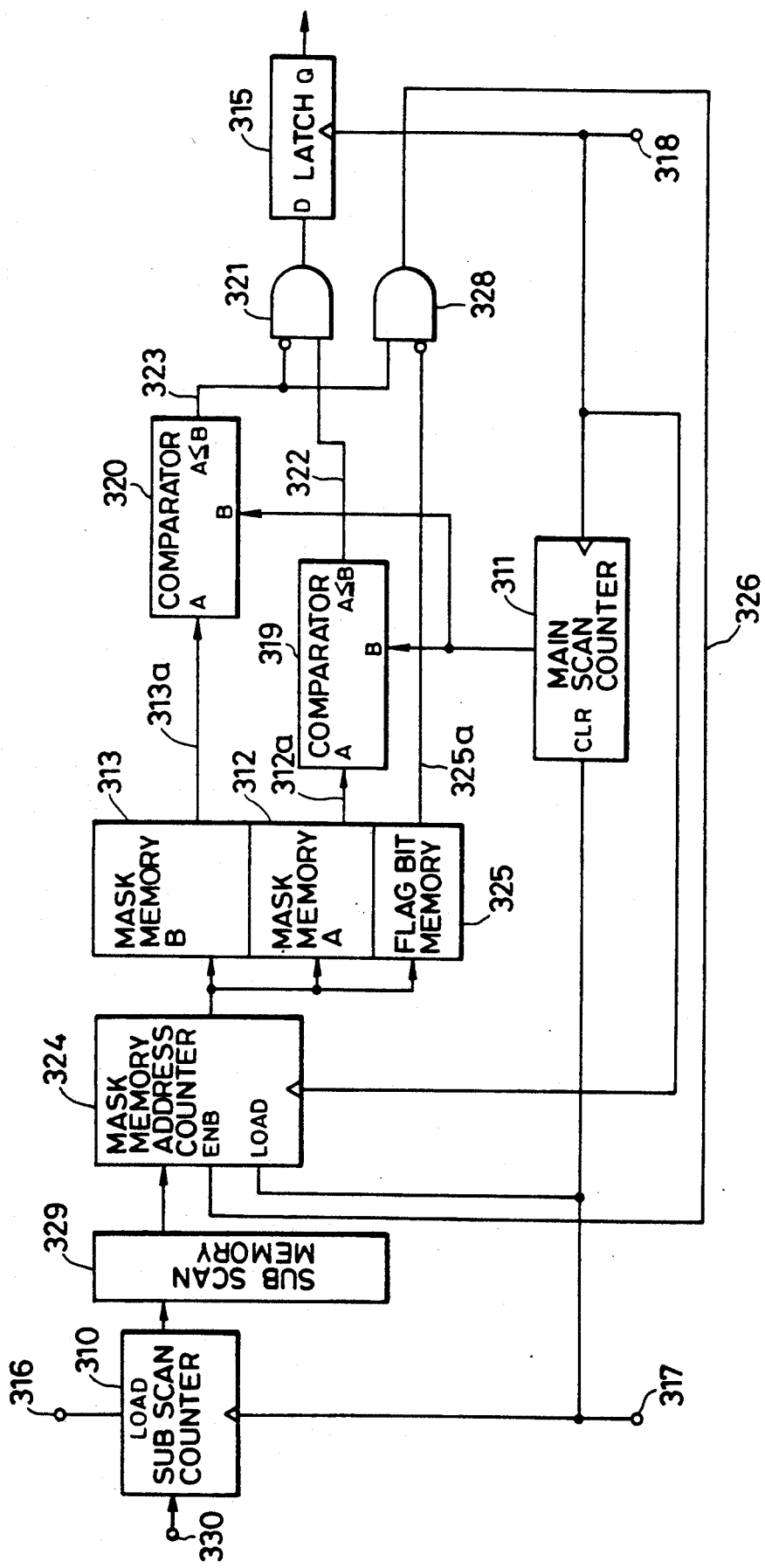

In the mask pattern shown in FIG. 32, the mask portion does not exist at sub scan addresses "0" to "2" and "30" to "39" and the contents of the corresponding mask memories A 312 and B 313 and flag bit memory 325 are also quite the same in all of these regions. Although not shown in detail in the diagram, on the other hand, the contents of the respective memories at sub scan addresses "15" to "21" are also the same at all. FIG. 38 shows an example in which to reduce the memory capacity in this overlap memory region, the overlap of the memory content for the sub scan is permitted for the sub scan memory 329 shown in FIG. 37 and an arrangement in which the data is not arranged in accordance with the ascending order is permitted. The circuit arrangement in this case is shown in FIG. 39. In FIG. 39, a counter similar to the sub scan counter 310 shown in FIG. 30 is provided before the sub scan memory 329 in FIG. 36.

Reference numeral 330 denotes a sub scan start address. The content of the sub scan memory 329 which was addressed by the sub scan counter 310 is loaded into the mask memory address counter 324 by the main scan start signal 317, so that the same mask memories A 312 and B 313 and flag bit memory 325 are addressed as well for different sub scans.

Therefore, for example, in the fourth and fifth embodiments, the memory capacity as much as the number of words above the number of sub scanning lines is needed; however, the memory capacity can be remarkably reduced as shown in FIG. 38. In the example shown in FIG. 32, the capacity of twenty-five words is sufficient. In the embodiment shown in FIGS. 36 and 37, the capacity of total forty-four words was needed.

By constituting as mentioned above, even in the case of changing the mask pattern as well, it is sufficient to rewrite only the memory contents of the mask memory and the like of only the corresponding portion in the sub scanning direction. On the other hand, in the case where the number of words to be stored increases as well, the mask data can be additionally written from the next address where no data is written.

Figure 40:
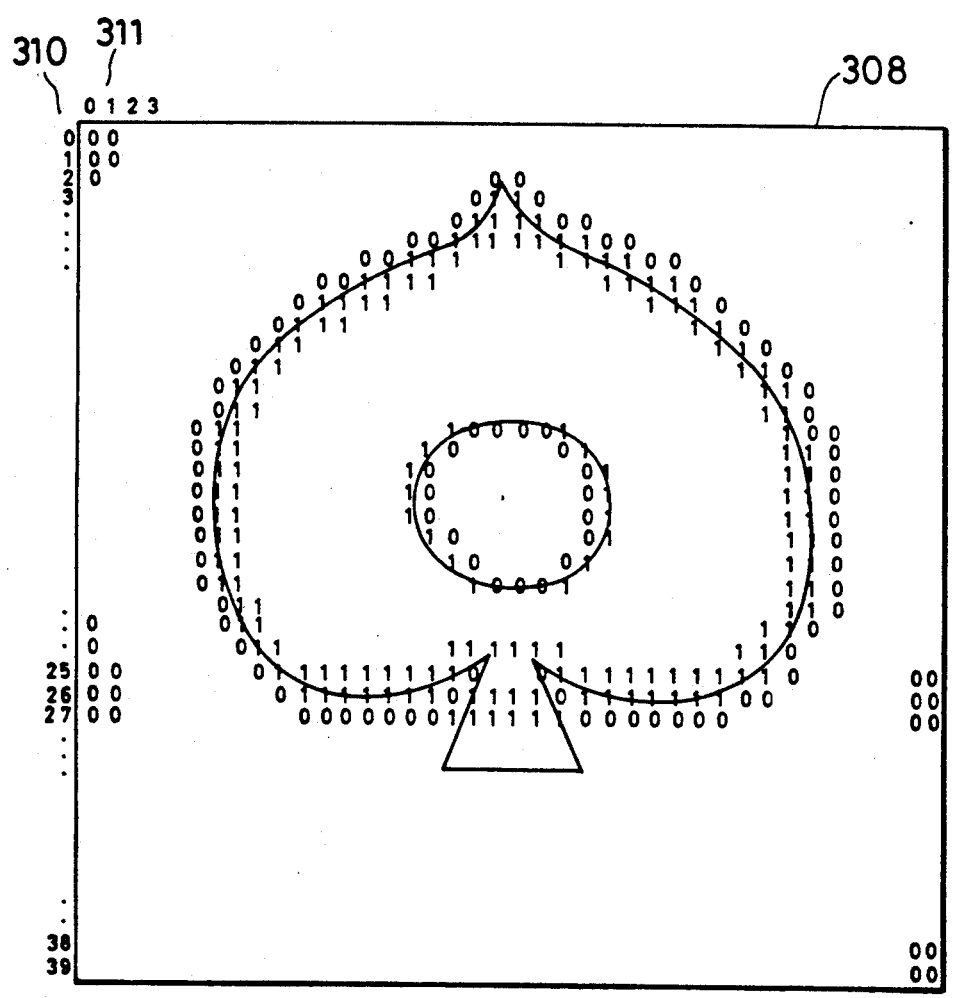
FIG. 40 is a diagram showing an example of the change of the mask pattern shown in FIG. 32 expressed in another bit map.
Figure 41:
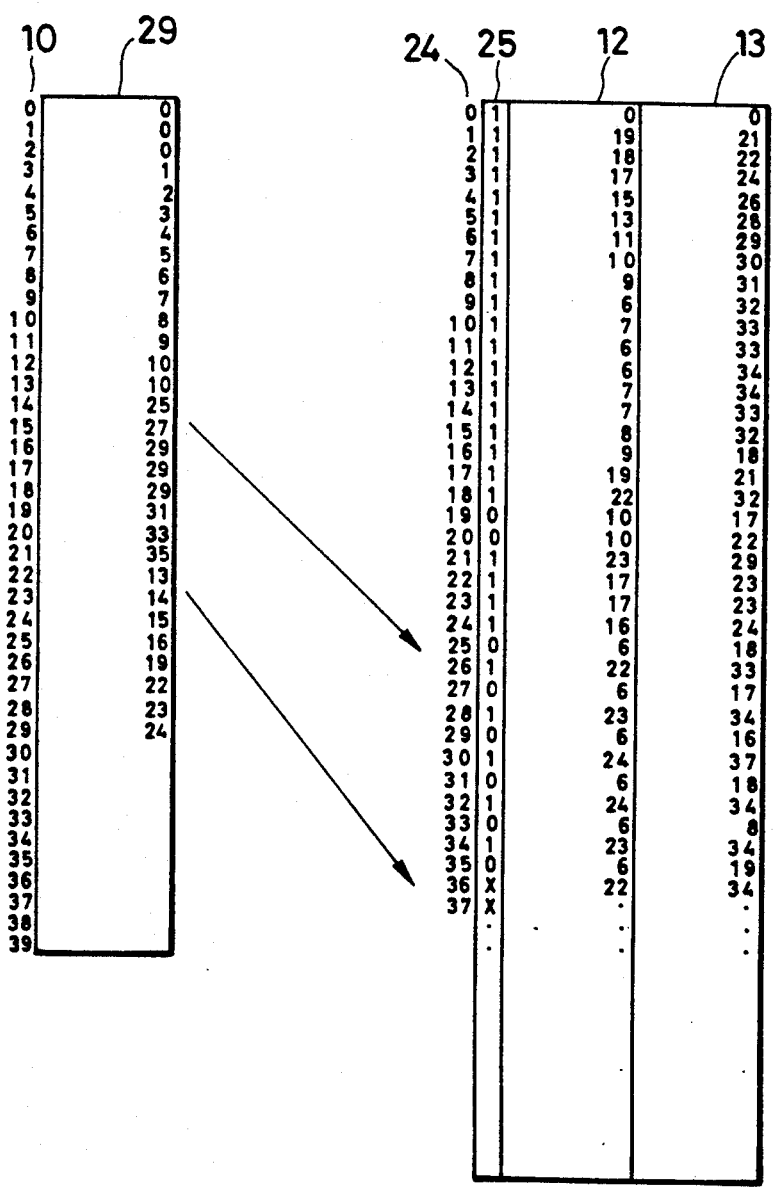
FIG. 41 is a diagram showing an example of the storage of the mask pattern when it is changed to the mask pattern shown in FIG. 40 in the sixth embodiment shown in FIG. 39.

FIG. 41 shows the contents of the sub scan memory 329, mask memories A 312 and B 313, and flag bit memory 325 in the case of forming a mask pattern shown in FIG. 40 by rewriting the mask pattern shown in FIG. 32.

In this case, it is sufficient to rewrite the contents of addresses "14" to "21" of the sub scan memory 329 corresponding to the sub scan addresses of which the mask pattern was changed and to write new mask pattern data into respective addresses "25" to "36" in the mask memories A 312 and B 313 and flag bit memory 325. Therefore, the mask pattern can be very easily changed to an arbitrary mask pattern at a high speed. When the mask pattern is changed in the embodiment shown in FIG. 36, not only the data in the sub scan memory must be rewritten but also the data after the change start positions in the mask memories A 312 and B 313 and flag bit memory 325 must be all rewritten and shifted, so that it takes a long time and it is very troublesome.

In any of the foregoing third to sixth embodiments, the image effective signal can be sent synchronously with the image which is transferred onto the raster. These embodiments are particularly effective for the image processing apparatus which receives the input image as such a raster data.

In addition, since the memory capacity is extremely reduced to a capacity below a fraction of tens, it is desirable to perform the following processes. Namely, the memory address value below the decimal point is prepared for the mask pattern so that the image data can be enlarged (or the address value is held as a floating point). In the ordinary case of reading the mask pattern, the mask pattern is read out as an address value of which the figures below the decimal point were omitted. In the case where the image data or the like is enlarged, the values below the decimal point are also used as parameters for interpolation in the enlarging process. Further, in the sub scanning direction as well, it is also possible to read out the data at once with respect to two adjacent sub scans and to perform the interpolating process, thereby obtaining the smooth extraction boundary including the sub scanning direction as well.

This means that the invention can be also applied such that the two-dimensional data which is transmitted onto the raster is rotated while interpolating the data due to the neighborhood calculation.

As described above, the figures below the decimal point of the read addresses in the image memory are not used to access the image memory nor mask memory in the ordinary image processes. For example, in the enlarging process, the image in the adjacent main scanning directions or the image data in the sub scanning direction of two are out a number of times corresponding to the magnification, respectively. However, in this case, the smooth extraction boundary is obtained with respect to the concentration of the image data having gradations using the values below the decimal point as references. For example, when a value below the decimal point is 0.7, in the case of doubling the image data, the extraction boundary becomes the address of the relevant integer part n.7+0.7=(n+1).4, so that the next position after the scan can be set to the extraction boundary.

Figure 42:
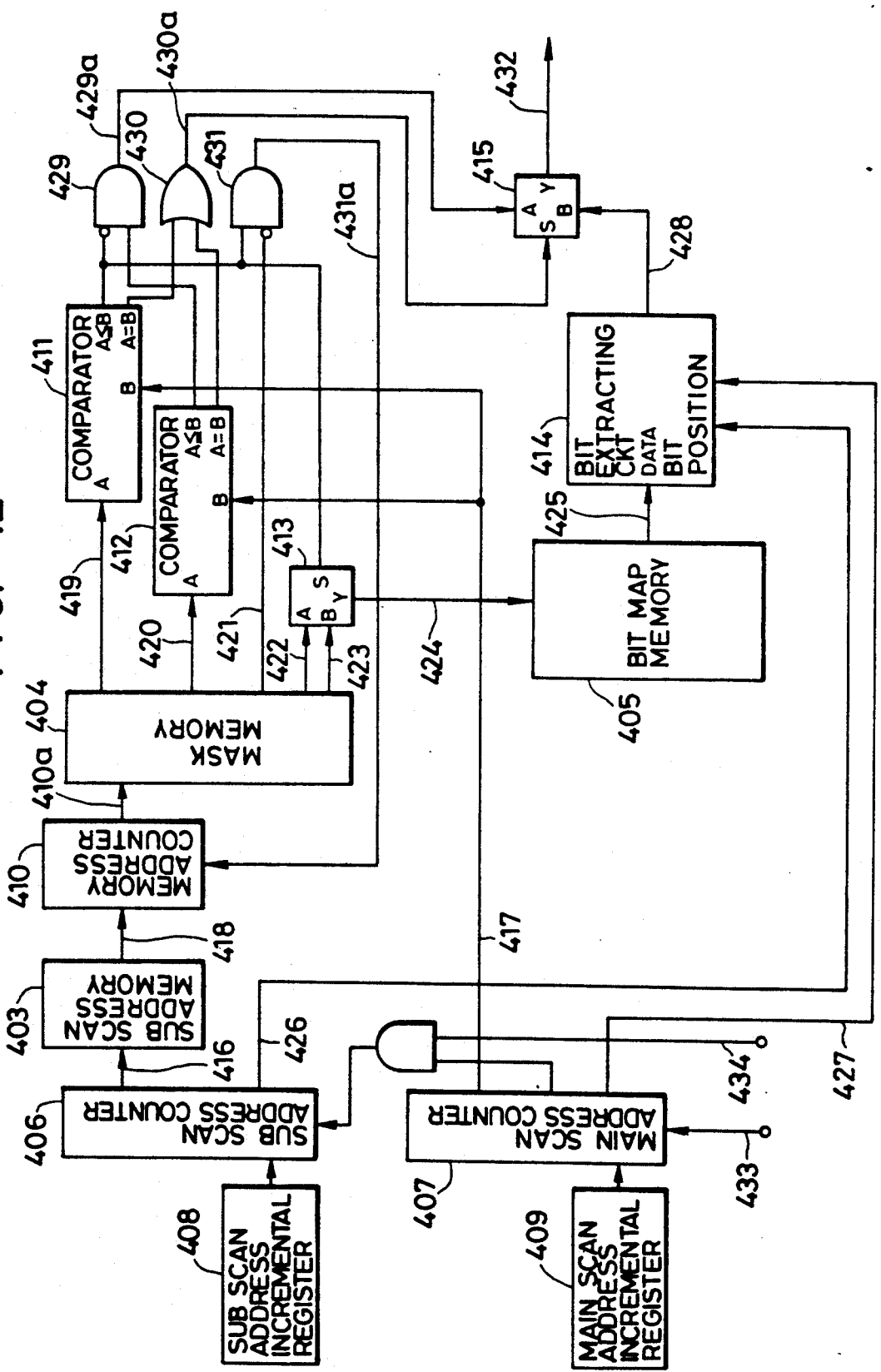
FIG. 42 is a block diagram of the seventh embodiment.

Constitution of the Seventh Embodiment (FIG. 42)

FIG. 42 is a block diagram of the seventh embodiment according to the invention. In the diagram, reference numeral 403 denotes a sub scan address memory; 404 is a mask memory to store mask pattern boundary position data (main scan address) in each sub scan (for every line of the main scan); 405 denotes a bit map memory to hold the fine mask data of the bit map corresponding to the image data concentration at the boundary position (main scan address) held in the mask memory 404; 406 denotes a sub scan address counter to hold the sub scan address having a decimal part and sequentially count up in accordance with the incremental value in a sub scan address incremental register 408; 407 denotes a main scan address counter to hold the main scan address having a decimal part and sequentially count up in accordance with the increased value of a main scan address incremental register 409; 408 denotes the sub scan address incremental register; and 409 denotes the main scan address incremental register. In addition, numeral 410 denotes a memory address counter for the mask memory 404; 411 and 412 are comparators A and B to compare data (419, 420) read out of the mask memory 404 with the value of the main scan address counter 407; 413 and 415 are data selectors; and 414 denotes a bit extracting circuit.

Figure 44:
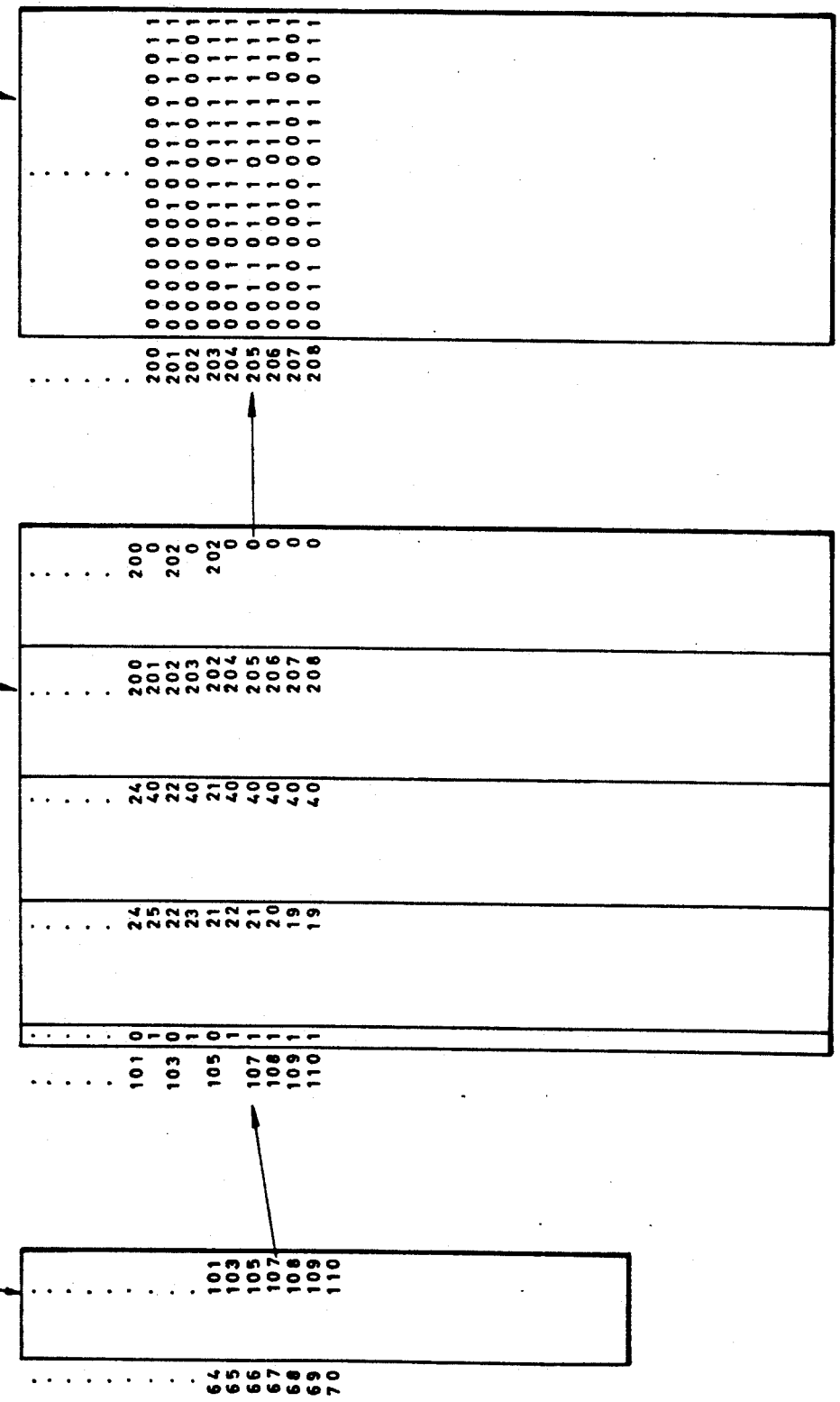
FIG. 44 is a diagram for explaining the content stored of the mask data of the seventh embodiment.

FIG. 44 shows examples of the memory contents of the main scan address memory 403, mask memory 404, and bit map memory 405. The contents in FIG. 44 relate to the case in which the mask pattern shown in FIG. 8 was stored in this embodiment.

Figure 43:
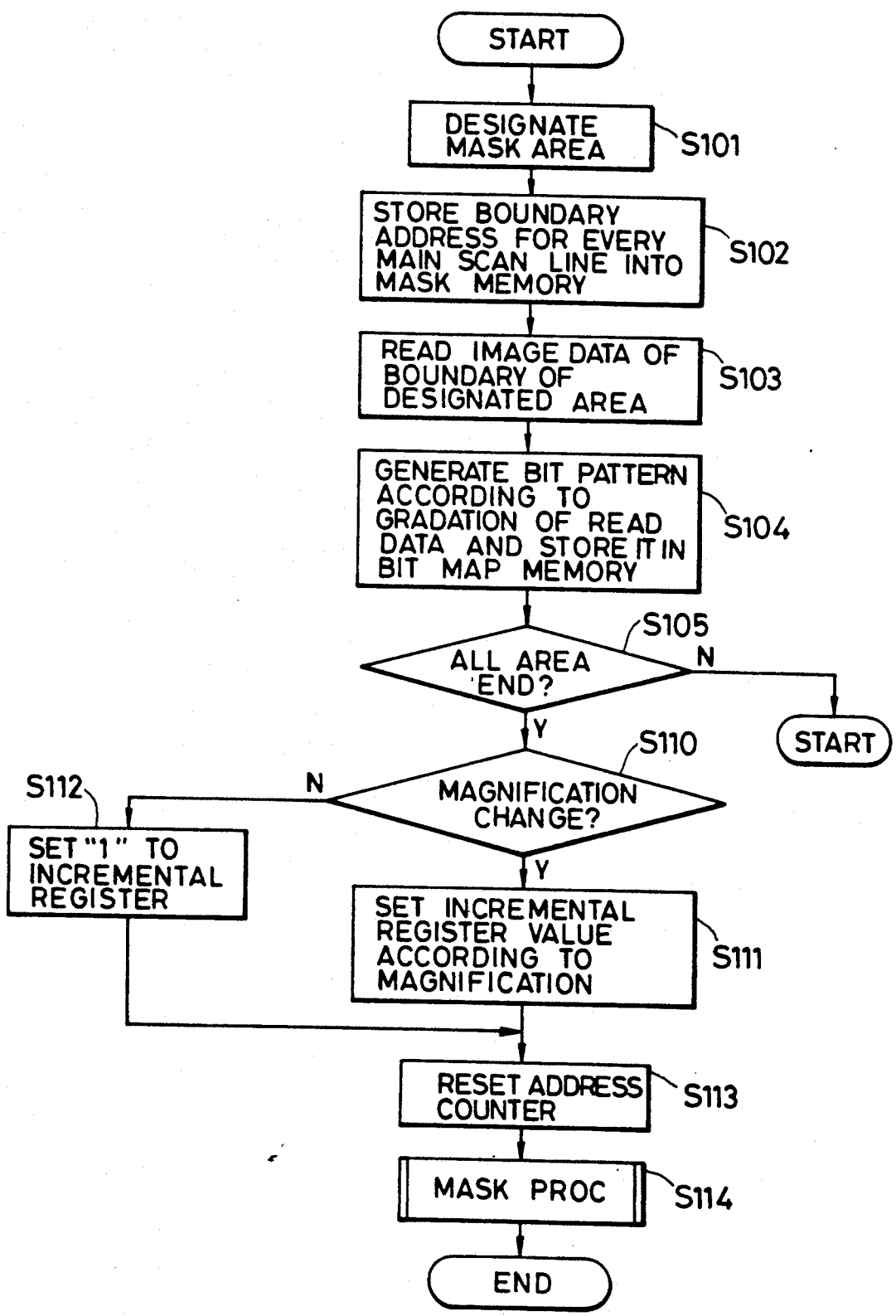
FIG. 43 is an operation flowchart of the seventh embodiment.

Operation of the Seventh Embodiment (FIG. 43)

The operation of the seventh embodiment having the above constitution will now be described hereinbelow with reference to a flowchart of FIG. 43.

The operator of the image processing apparatus watches an image data display device (not shown) and the like and performs the designation and the like of an area (mask area) of an image to be extracted in the display image data in step S101. At the same time, the apparatus instructs the magnification changing process such as enlargement/reduction or the like of the extracted image and executes it as necessary. When the mask area is designated, in an image processing unit (not shown), the main scan boundary address for every line in the main scanning direction of the designated area is stored in the sub scan address memory 403 and mask memory 404 in correspondence to the sub scan address in step S102. In the next step S103, the image data of the boundary portion of the designated area is read as multigradation data. Subsequently, the data read in step S404 is converted and produced to the fine bit pattern in accordance with the predetermined maximum enlargement magnification (or designated enlargement magnification) and gradation in the apparatus and this fine bit pattern is stored into the bit map memory 405. Although the image data of the boundary portion is stored into the bit map memory 405 in steps S103 and S104, the image data itself of the boundary portion can be also enlarged with the maximum enlargement magnification or designated enlargement magnification and stored into the bit map memory 405. A check is made in step S105 to see if the processes for all designated areas (whole image area) have been finished or not. If YES in step S105, the preparation for extraction is now all completed.

Figure 8:
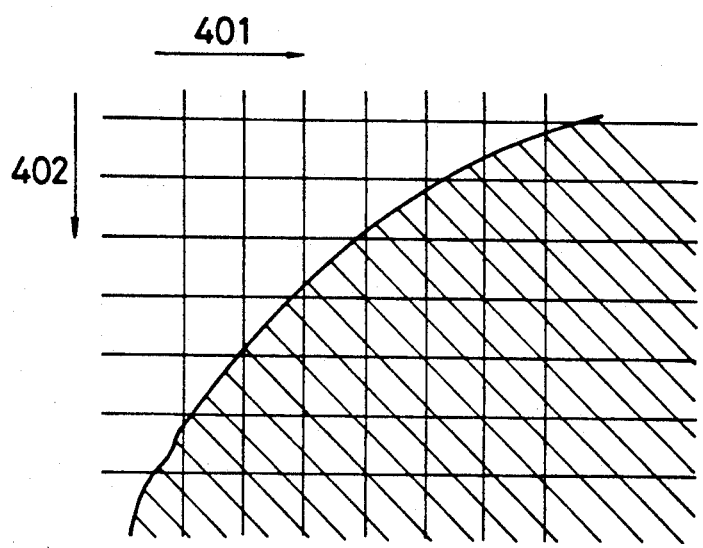
FIG. 8 is a diagram showing an example of a mask pattern.

FIG. 44 shows examples in which the mask pattern boundary data shown in FIG. 8 was stored into the memories 403, 404 and 405. FIG. 44 shows the case where the maximum enlargement magnification is four.

Figure 9:
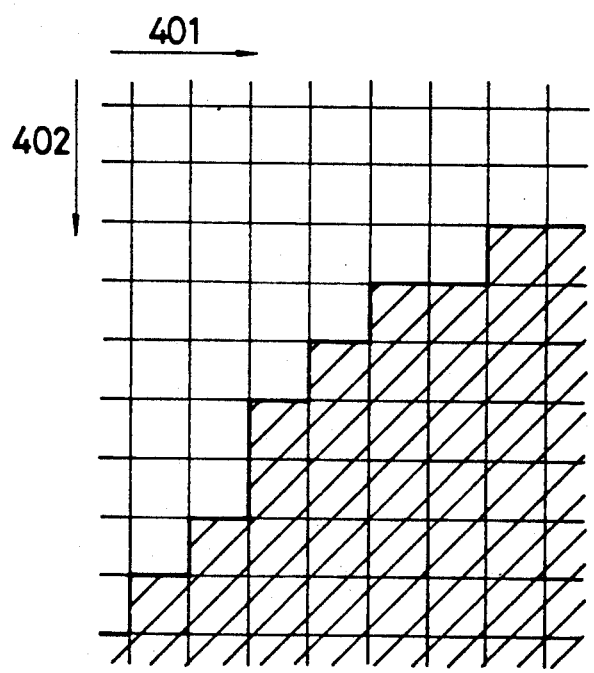
FIG. 9 is a diagram showing a conventional example of the production of mask patterns.

In FIG. 8, reference numeral 401 denotes a main scanning direction and 402 indicates a sub scanning direction and the same shall also apply to FIG. 9 and FIG. 45, which will be explained hereinafter.

Thereafter, a check is made in step S110 to see if a magnification for the extracted image has been designated or not at the start of the extracting process. If YES in step S110, incremental values are set into the sub scan address incremental register 408 and main scan address incremental register 409 in accordance with the changed magnification in step S111. For example, in the case of the enlargement of four times, "0.25" is set and in the case of the reduction into ½, "2" is set. On the contrary, in NO in step S110, step S112 follows and "1" is set into the registers 408 and 409, respectively. Then, step S113 follows and the counters 406 and 407 are reset. The mask process is executed in step S114.

The case of enlarging the hatched portion shown in FIG. 8 four times will now be described as an example in detail hereinbelow.

In this case, the contents of the memories 403, 404 and 405 become as shown in FIG. 44. Namely, an explanation will now be made as an example with respect to the case where, as initial conditions, the content of the sub scan address counter 406 is "67.0", the content of the main scan address counter 407 is "20.75", the content of the sub scan incremental register 408 is "0.25", and the content of the main scan incremental register 409 is "0.25".

At this time, among the address values held in the counter 406, an integer portion sub scan address 416 is "67" and a decimal portion sub scan address 426 is "0". On the other hand, among the address values held in the counter 407, an integer portion main scan address 417 is "20" and a decimal portion main scan address 427 is "75". Therefore, "67" is output as an address value to the sub scan address memory 403. As shown in FIG. 44, the content in address "67" is "107" and an output 433 from the memory 403 becomes "107". Thus, "107" is set into the memory address counter 410 and a mask memory address 410a into the mask memory 404 becomes "107".

The mask memory 404 outputs the content in address "107" shown in FIG. 44. Namely, "40" is supplied as an A input 419 to the comparator A 411, while "21" is supplied as an A input 420 to the comparator B 412. In addition, "1" is supplied as a memory address counter count-up signal 421 to a gate circuit 431, "205" is supplied as an A input 422 to the selector 413 for selectively outputting the address value to the bit map memory 405, and "0" is supplied as a B input 423 to the selector 413, respectively.

Therefore, at this time, both outputs of A≦B and A=B of the comparators A 411 and B 412 are "0" and an output of the data selector 415 is also "0".

In this state, when the main scan clock 433 is input to the main scan address counter 407, the incremental value "0.25" of the main scan address incremental register 409 is newly added. Therefore, the value of the counter 407 changes from "20.75" to "21". Thus, "21" is supplied as a B input to the comparator B 412 and both of the A input 420 and the B input 417 are equal to "21", so that outputs of a gate circuits 429 and 430 also become "1". When a selection signal 430a from the gate circuit 430 becomes "1", the data selector 415 selects an input on the B side in place of the input on the A side and generates the B input. Thus, fine mask data 428 from the bit extracting circuit 414 is output to an output line 432. "205" is supplied to an output 424 of the selector 413 as an address input of the bit map memory 405. "0011011101111111" as the memory content corresponding to this address value is output to a reading line 425 and input to the bit extracting circuit 414.

At this time, both outputs of the addresses 426 and 427 are "0" and the bit extracting circuit 404 extracts the head value "0" of the fine mask data 425 from the bit map memory 405 and supplies as an output 432.

The output 432 is also supplied to the B input of the data selector 415.

In this state, when one main scan clock 433 is further input, the value of the counter 407 becomes "21.25" and "25" is output to the address 427. In correspondence to this, the bit extracting circuit 404 extracts "0" as the second value of the fine mask data 425 and outputs.

When the next main scan clock 433 is input, the address 427 becomes "50" and the bit extracting circuit 414 extracts "1" as the third value of the fine mask data 425 and outputs in a manner similar to the above.

When two main scan clocks 433 are further input, the decimal portion main scan address 427 becomes "0" and the integer portion main scan address 417 changes from "21" to "22". At this time, the output 430a of the gate circuit 430 becomes "0" and the data selector 415 selects an output 429a of the gate circuit 429 and outputs. Therefore, the output 432 of the data selector 415 becomes "1".

Thereafter, when the count value of the sub scan address counter 406 is "67.25" and the count value of the main scan address counter 407 is "21.0", the output 432 becomes "0". When the count value of the counter 407 becomes "21.25", the output 432 becomes "1".

Figure 45:
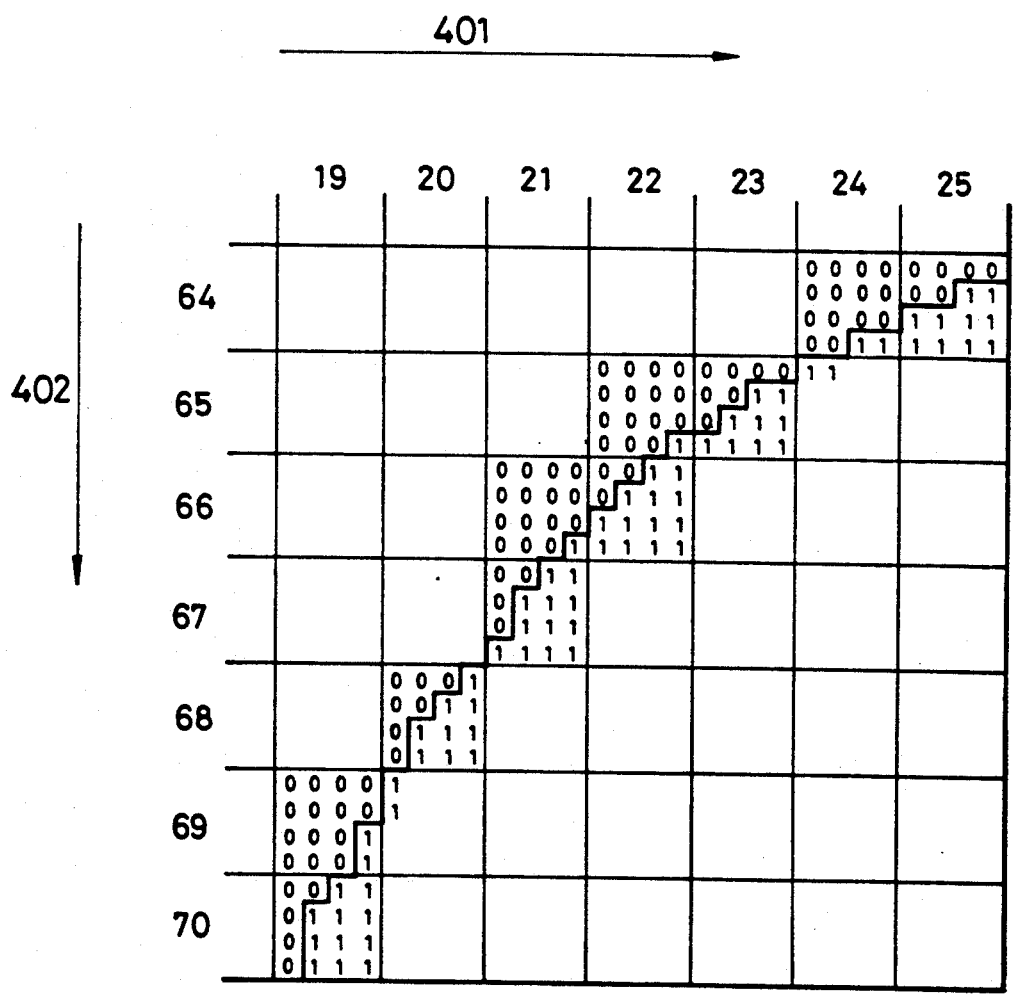
FIG. 45 is a diagram showing an example of the production of the mask pattern according to the seventh embodiment.

FIG. 45 shows an example of the mask pattern produced due to the foregoing control procedure.

According to the embodiment as mentioned above, even when the enlarging process was performed as well, the smooth boundary portion shown in FIG. 45 is derived.

Now, one bit is assigned to each pixel for the data of which the image of the A4 size was digitized at the resolution of 16 pel/mm and the mask pattern of the bit map having the bit corresponding relation is formed. This mask pattern is stored as mask data. In this case, the memory capacity of about 16M bits is needed. However, according to the memory constitution due to this embodiment, assuming that the change-over boundary between "0" and "1" of the mask occurs at most twice for single main scan, the capacity of 62 k bits is enough for the sub scan address memory 403, the capacity of 243 kbits is sufficient for the mask memory 404, and the capacity of 152 kbits is adequate for the bit map memory 405. Thus, the memory can be constituted by only the memory capacity of 457 kbits as a whole. In the case where the enlarging process and the like were performed as well, the smooth extraction boundary is derived and it is possible to effectively cope with such a case. Therefore, as compared with the case of using the mask pattern memory of the bit map having the one-to-one corresponding relation, the fine mask pattern which is sixteen times as fine as that in such a case can be produced with the memory capacity of about 1/35 of the capacity of such a case.

On the other hand, in the case where there are many change-over portions between "0" and "1" in the mask pattern, for example, when there are four changeover portions as an average as well, the memory capacity of 852 kbits is sufficient as a whole. Thus, the memory capacity can be reduced to about 1/18 as compared with the case of the bit map memory having the one-to-one corresponding relation.

For example, when the masks corresponding to two main scans are quite the same, or the like, the contents of the mask memory 404 and bit map memory 405 can be repeatedly used, so that the memory capacity can be further saved. Practically speaking, the capacity of 225 Mbits is needed to realize the same fineness by the bit map. However, the same function as above can be obtained by the capacity of 852 kbits according to the embodiment.

In the foregoing embodiment, the fine bit map data is independently provided in the bit map memory 405; however, it can be also directly written into the portion of the pointer data in the mask memory 404 in which the mask change-over data has been stored to the bit map memory 405. In this case, although the memory capacity increases, the control mechanism is more simplified.

Although the incremental value of the address was set to "0.25", i.e., (¼) for the enlargement of four times and was equalized to the pitch width of the fine bit map data in this embodiment, it is not always necessary to equalize them. For example, in the case of doubling the image, it is sufficient to set the incremental value of the address to "0.5" in the present constitution.

The embodiment is not limited to the enlarging process. In the case of the same magnification process as well, by thinning only the mask pattern and outputting, further detailed boundary can be obtained.

Further, by thinning the pitch width of the bit map memory 405, even when the magnification is increased as well, the smooth boundary can be derived.

As described above, according to the present invention, by merely holding less mask data, the smooth extraction image of the boundary portion can be obtained. Even in the case where the original image data was subjected to the processes such as magnifying process and the like as well, the smooth extraction image in which the boundary portion is not notched can be derived.

According to the invention, there is the effect such that the mask process to extract arbitrary shapes of a plurality of image data is performed, respectively, and the masked image data can be arbitrary overlapped and synthesized.

The present invention is not limited to the foregoing first to seventh embodiments but many modifications and variations are possible within the spirit and scope of the appended claims of the invention.

What is claimed is:

1. An image processing apparatus comprising:
   means for generating image data having a first resolution and representing an original image;
   means for providing area data representing an arbitrary area of the original image, wherein the area data has a second resolution lower per unit area than the first resolution;
   means for forming area data having the first resolution from the area data of the second resolution by smoothing a slanted edge of the area data; and
   means for extracting the image data having the first resolution and representing an image of the arbitrary area of the original image from the image data having the first resolution generated by said generating means, in accordance with the area data having the first resolution formed by said forming means.

2. An image processing apparatus according to claim 1, wherein said providing means comprises means for storing the area data of the second resolution.

3. An image processing apparatus according to claim 1, wherein said forming means forms the area data of the first resolution on the basis of the plurality of area data of the second resolution.

4. An image processing apparatus according to claim 1, further comprising memory means for storing the image data extracted by said extracting means.

5. An image processing apparatus comprising:
   means for generating image data representing an original image;
   means for providing area data representing an arbitrary area of the original image;
   means for synthesizing the image data of the original image and the area data of the arbitrary area;
   means for processing the synthesized data, containing the image data and the area data, from said synthesizing means for changing an image size of the synthesized data;
   means for ensuring the separation of the image data and the area data from the synthesized data processed by said processing means; and
   means for extracting the image data representing an image of the arbitrary area of the original image from the image data, which is processed for changing an image size of the original image, separated by said separating means, in accordance with the area data separated by said separating means.

6. An image processing apparatus according to claim 5, further comprising means for correcting the area data from said separating means, and wherein said extracting means extracts the image data in accordance with the area data corrected by said correcting means.

7. An image processing apparatus according to claim 6, wherein said correcting means corrects the area data on the basis of a plurality of area data from said separating means.

8. An image processing apparatus according to claim 5, wherein said providing means comprises means for storing the area data.

9. An image processing apparatus according to claim 5, further comprising memory means for storing the image data extracted by said extracting means.

10. An image processing apparatus comprising:
    means for generating first image data representing a first original image from a first original and for subsequently generating second image data representing a second original image from a second original, the second original being separate and independent from the first original image,
    providing means for simultaneously providing first and second area data representing a first arbitrary area of the first original image and a second arbitrary area of the second original image, respectively;

extracting means for extracting image data representing an image of the first arbitrary area from the first image data in accordance with the first area data, and for extracting image data representing an image of the second arbitrary area from the second image data in accordance with the second area data; and means for synthesizing the extracted image data representing the image of the first arbitrary area and the extracted image data representing the image of the second arbitrary area.

11. An image processing apparatus according to claim 10, further comprising means for correcting the first and second area data provided by said providing means, and wherein said extracting means extracts the image data in accordance with the first and second area data corrected by said correcting means.

12. An image processing apparatus according to claim 11, wherein said correcting means corrects the first and second area data on the basis of the first and second area data means, respectively.

13. An image processing apparatus according to claim 12, wherein said providing means comprises means for storing the first and second area data.

14. An image processing apparatus according to claim 10, wherein said synthesizing means comprises memory means for storing the synthesized image data.

15. An image processing apparatus according to claim 10, wherein said providing means comprises means for storing the first and second area data.

16. An image processing apparatus comprising:

means for generating first image data representing a first original image from a first original and for subsequently generating second image data representing a second original image from a second original, the second original being separate and independent from the first original;

means for providing first and second area data respectively representing a first arbitrary area of the first original image and a second arbitrary area of the second original image, the first and second arbitrary areas partially overlying each other;

extracting means for extracting image data representing an image of the first arbitrary area from the first image data in accordance with the first area data, and for extracting image data representing an image of the second arbitrary area for the second image data in accordance with the second area data; and means for synthesizing the extracted image data representing the image of the first arbitrary area and the extracted image data representing the image of the second arbitrary area, said synthesizing means mixing first image data and second image data corresponding to an overlayed portion of the first arbitrary area and the second arbitrary area.

17. An image processing apparatus according to claim 16, further comprising means for correcting the first and second area data provided by said providing means, and wherein said extracting means extracts the image data in accordance with the first and second area data corrected by said correcting means.

18. An image processing apparatus according to claim 17, wherein said correcting means corrects the first and second area data on the basis of the plurality of first and second area data, respectively.

19. An image processing apparatus according to claim 16, wherein said providing means comprises means for storing the first and second area data.

20. An image processing apparatus according to claim 16, wherein said synthesizing means comprises memory means for storing the synthesized image data.

21. An image processing apparatus comprising:

means for generating image data representing an original image;

means for providing area data representing an arbitrary area of the original image;

means for processing the image data in order to change an image size of the original image;

means for correcting the area data of the arbitrary area to smooth a slanted line represented by the area data, in accordance with the rate of changing of the image size; and means for extracting image data representing an image of the arbitrary area of the original image from the image data processed by said processing means, in accordance with the area data corrected by said correcting means.

22. An image processing apparatus according to claim 21, wherein said providing means provides the area data representing a boundary position of the arbitrary area of the original image.

23. An image processing apparatus according to claim 21, wherein said correcting means causes said providing means to provide the same area data a predetermined number of times, according to the rate of changing of the image size.

24. An image processing apparatus according to claim 21, wherein said generating means generates the image data on a line-by-line basis, and said extracting means extracts the image data line-by-line.

25. An image processing apparatus according to claim 21, wherein said providing means comprises means for storing the area data.

26. An image processing apparatus according to claim 21, further comprising means for storing the image data extracted by said extracting means.

27. An image processing apparatus comprising:

means for generating image data having a first resolution of pixels per unit area and representing an original image;

a bit map memory for storing area data representing an arbitrary area of the original image, each bit of said memory corresponding to a position of the original image, wherein the area data has a second resolution of pixels per unit area lower than the first resolution of pixels per unit area;

means for forming area data having the first resolution from the area data of the second resolution; and means for extracting the image data having the first resolution and representing an image of the arbitrary area of the original image from the image data having the first resolution generated by said generating means, in accordance with the area data having the first resolution formed by said forming means.

28. An apparatus according to claim 27, wherein said forming means forms the area data of the first resolution on the basis of the area data of the second resolution.

29. An apparatus according to claim 27, further comprising memory means for storing the image data extracted by said extracting means.

30. An apparatus according to claim 27, wherein said forming means smoothes a line defined by the area data when forming the area data having the first resolution.

* * * * *

UNITED STATES PATENT AND TRADEMARK OFFICE
CERTIFICATE OF CORRECTION

PATENT NO. : 5,222,159
DATED : June 22, 1993
INVENTOR(S) : NAOTO KAWAMURA, ET AL.

It is certified that error appears in the above-indentified patent and that said Letters Patent is hereby corrected as shown below:

COLUMN 1
 Line 28, "memory to" should read --memory (to--.
 Line 60, "later used." should read --later.--.

COLUMN 2
 Line 63, "in to" should read --into--.

COLUMN 9
 Line 56, "pixels" should read --pixels.--.

COLUMN 11
 Line 34, "27C" should read --27C)--.

COLUMN 12
 Line 31, "shwos" should read --shows--.

COLUMN 17
 Line 65, "are" should read --are read--.

UNITED STATES PATENT AND TRADEMARK OFFICE
CERTIFICATE OF CORRECTION

PATENT NO. : 5,222,159
DATED : June 22, 1993
INVENTOR(S) : NAOTO KAWAMURA, ET AL.

It is certified that error appears in the above-indentified patent and that said Letters Patent is hereby corrected as shown below:

COLUMN 22
    Line 61, "a" should be deleted.
    Line 65, "original image," should read --original;--.

Signed and Sealed this

Thirty-first Day of May, 1994

Attest:

BRUCE LEHMAN

Attesting Officer     Commissioner of Patents and Trademarks